United States Patent
Adachi et al.

(10) Patent No.: US 10,960,717 B2
(45) Date of Patent: Mar. 30, 2021

(54) TOWING DEVICE OF AUTOMATIC GUIDED VEHICLE AND AUTOMATIC GUIDED VEHICLE HAVING THE SAME

(71) Applicants: AICHIKIKAI TECHNOSYSTEM CO., LTD., Nagoya (JP); HONDA MOTOR CO., LTD., Tokyo (JP)

(72) Inventors: Ryuji Adachi, Nagoya (JP); Takayuki Kaneko, Tokyo (JP)

(73) Assignees: Aichikikai Technosystem Co., Ltd., Nagoya (JP); Honda Motor Co., Ltd., Tokyo (JP)

( * ) Notice: Subject to any disclaimer, the term of this patent is extended or adjusted under 35 U.S.C. 154(b) by 268 days.

(21) Appl. No.: 16/099,852

(22) PCT Filed: Mar. 31, 2017

(86) PCT No.: PCT/JP2017/013516
§ 371 (c)(1),
(2) Date: Nov. 8, 2018

(87) PCT Pub. No.: WO2017/195493
PCT Pub. Date: Nov. 16, 2017

(65) Prior Publication Data
US 2019/0126697 A1 May 2, 2019

(30) Foreign Application Priority Data
May 12, 2016 (JP) .............................. JP2016-096348

(51) Int. Cl.
*B60D 1/04* (2006.01)
*B61B 10/04* (2006.01)
(Continued)

(52) U.S. Cl.
CPC ............... *B60D 1/04* (2013.01); *B61B 10/04* (2013.01); *B61B 13/00* (2013.01); *B61G 1/02* (2013.01); *B61G 1/283* (2013.01)

(58) Field of Classification Search
CPC ... B60D 1/00; B60D 1/01; B60D 1/04; B61G 1/00; B61G 1/02; B61G 1/04; B61G 1/36; B61G 1/40
See application file for complete search history.

(56) References Cited

U.S. PATENT DOCUMENTS 5,350,077 A * 9/1994 Nezu ..................... B61G 1/283
180/168

FOREIGN PATENT DOCUMENTS

| CN | 102050159 A | 5/2011 |
|----|-------------|--------|
| JP | 07-172353 A | 7/1995 |

(Continued)

OTHER PUBLICATIONS

International Search Report dated Jun. 20, 2017 for corresponding foreign Application No. PCT/JP2017/013516, pp. 2.

*Primary Examiner* — Robert J McCarry, Jr.
(74) *Attorney, Agent, or Firm* — United IP Counselors, LLC

(57) ABSTRACT

A towing device of an automatic guided vehicle is mounted on the automatic guided vehicle for towing a cart. The towing device includes a hook member and a driving device. The hook member is engageable with a cart and is to be engaged with the cart in an elastically biased state at least when towing the cart. The driving device is for driving the hook member.

11 Claims, 18 Drawing Sheets

TRAVELING DIRECTION

(51) Int. Cl.
*B61B 13/00* (2006.01)
*B61G 1/02* (2006.01)
*B61G 1/28* (2006.01)

(56) References Cited

FOREIGN PATENT DOCUMENTS

| | | |
|---|---|---|
| JP | 08-299391 A | 11/1996 |
| JP | 2000-159098 A | 6/2000 |
| JP | 2000-211526 A | 8/2000 |
| JP | 2011-102076 A | 5/2011 |

\* cited by examiner

TOWING DEVICE OF AUTOMATIC GUIDED VEHICLE AND AUTOMATIC GUIDED VEHICLE HAVING THE SAME

CROSS-REFERENCES TO RELATED APPLICATIONS

This application is the U.S. National Phase of PCT International Application No. PCT/JP2017/013516, filed on Mar. 31, 2017. That application claims priority to Japanese Patent Application No. 2016-096348, filed May 12, 2016. The contents of both applications are herein incorporated by reference in their entirety.

BACKGROUND

Technical Field

The present disclosure relates to a towing device of an automatic guided vehicle and an automatic guided vehicle having the same.

Background Art

Japanese Patent Application Laid-Open No. 2000-159098 (Patent Document 1) discloses a towing device of an automatic guided vehicle, including a claw member provided rotatably with respect to a vehicle body of the unmanned guided vehicle and a V-shaped block provided to move upward and downward with respect to the vehicle body of the unmanned guided vehicle, wherein the pawl member and the V-shaped block are configured to be engaged with a frame of a cart.

In the towing device of the automatic guided vehicle described in the above publication, a ¼ arc-shaped engaging surface of the claw member and a V-shaped abutting surface of the V-shaped block are engaged with the frame of the cart so that the frame of the cart can be clamped from the front and rear sides in the traveling direction of the automatic guided vehicle. This can achieve a reliable towing of the cart without detaching it, even when the automatic guided vehicle travels on a slope or the like.

BRIEF SUMMARY

However, in the towing device of the automatic guided vehicle described in the above publication, when the automatic guided vehicle travels on a bumpy road that causes vibrations on the automatic guided vehicle and the cart in the up-down direction, the engagement of the claw member and the V-shaped block with the frame of the cart might be released. Thus, the automatic guided vehicle can be further improved to counter vibrations.

The present disclosure has been made in view of the above problems, and it is an object of the present disclosure to provide an automatic guided vehicle capable of reliably towing a cart without detaching it even when vibrations in the up-down direction occur on the automatic guided vehicle and the cart.

Solutions to Problem

A towing device of an automatic guided vehicle and an automatic guided vehicle having the same according to the present advancement adopt the following measures to achieve the above objects.

According to a preferable embodiment of the towing device of the automatic guided vehicle according to the present advancement, a towing device of an automatic guided vehicle is configured, the towing device being mounted on the automatic guided vehicle to tow a cart. The towing device of the automatic guided vehicle includes a hook member that is engageable with the cart; and a driving device for driving the hook member. The hook member is configured to be engaged with the cart in an elastically biased state at least when towing the cart.

According to the present advancement, the hook member is engaged with the cart in an elastically biased state, at least when towing the cart. As a result, even when the automatic guided vehicle towing the cart travels on a bumpy road that causes vibrations on the automatic guided vehicle and the cart in the up-down direction, a disengagement of the hook member from the cart can be effectively prevented. This can achieve a reliable towing of the cart without detaching it.

According to the towing device of an automatic guided vehicle according to the present advancement, the driving device includes a motor having a rotating shaft; a moving member that reciprocates in a vertical direction based on rotating motion of the rotating shaft; and a spring member biasing the moving member vertically upward. Further, the spring member is capable of applying a spring force to the hook member through the moving member. Furthermore, the hook member is configured to enter either an engageable state in which the hook member is capable of engaging with the cart based on the reciprocating motion in the vertical direction of the moving member or non-engageable state in which the hook member is not engaged with the cart. Moreover, the hook member is configured to be engaged with the cart with the hook member being biased with the spring force when the hook member is in the engageable state.

According to the present embodiment, a configuration can be easily achieved in which the hook member can be operated only when the cart is towed, and the hook member can be elastically engaged with the cart.

According to a further embodiment of the towing device of an automatic guided vehicle according to the present advancement, the hook member is rotatably mounted to a vehicle body of the automatic guided vehicle and is configured to rotate based on the reciprocating motion of the moving member in the vertical direction.

According to the present embodiment, because the hook member is rotated to enter either the engageable state or the non-engageable state, a space in the vertical direction for accommodating the hook member can be smaller than that in a configuration in which the hook member is vertically moved to enter either the engageable state or the non-engageable state. Thereby, the size in the height direction of the automatic guided vehicle can be reduced to form a lower floor.

According to a further embodiment of the towing device of an automatic guided vehicle according to the present advancement, the hook member includes a long handle part and a short handle part intersecting the long handle part. The long handle part has a short-handle-side end part that is connected to the short handle part and that is engageable with the moving member, and has an opposite end part that is located opposite to the short-handle-side end part and that is rotatably supported to the vehicle body of the automatic guided vehicle.

According to the present embodiment, a configuration can be easily achieved in which the hook member is rotated based on the reciprocating motion in the vertical direction of the moving member.

According to a further embodiment of the towing device of an automatic guided vehicle according to the present advancement, the hook member is integral with the moving member, and reciprocates in the vertical direction as the moving member reciprocates in the vertical direction.

According to the present embodiment, a configuration can be easily achieved in which the hook member enters either the engageable state or the non-engageable state.

According to a further embodiment of the towing device of an automatic guided vehicle according to the present advancement, the hook member engages with a frame of the cart on a rear side of the frame in the traveling direction of the automatic guided vehicle, when the automatic guided vehicle travels forward. The towing device of an automatic guided vehicle further includes a restricting member that restricts a forward movement of the frame in the traveling direction after the hook member engages with the frame.

According to the present embodiment, a reliable towing of the cart without detaching it can be achieved even when the cart coasts after the automatic guided vehicle stops traveling forward or even when the automatic guided vehicle travels rearward.

According to a further aspect of the towing device of an automatic guided vehicle according to the present advancement, the restricting member is configured to allow the frame to move rearward when the frame abuts against the restricting member on the front side of the restricting member, and to restrict the forward movement of the frame when the frame abuts against the restricting member on the rear side of the restricting member.

According to the present embodiment, the restricting member can be effectively prevented from hindering the engagement when the hook member is engaged with the frame of the cart from the rear side in the traveling direction. Furthermore, the detachment of the cart can be effectively prevented by restricting the movement of the frame by the restricting member when the hook member is in engagement with the frame of the cart.

According to a further aspect of the towing device of an automatic guided vehicle according to the present advancement, the restricting member is configured to allow the rearward movement of the frame by rotating or inclining when the frame abuts against the restricting member on the front side, and to restrict the forward movement of the frame by returning to an initial state when the abutment of the frame against the restricting member on the front side is released.

According to the present embodiment, a configuration can be easily achieved which allows the rearward movement of the frame when the frame abuts against the restricting member on the front side and restricts the forward movement of the frame when the frame abuts against the restricting member on the rear side, because the restricting member is only configured to rotate or incline and return into the initial state.

According to a further aspect of the towing device of an automatic guided vehicle according to the present advancement, the restricting member has an abutting surface against which the frame is able to abut from the front side of the restricting member. The abutting surface is configured to incline upward from the front side to the rear side of the restricting member.

According to the present embodiment, the frame of the cart can be smoothly operated when moving rearward while abutting against the restricting member on the front side of the restricting member.

According to a preferred embodiment of the automatic guided vehicle according to the present disclosure, the automatic guided vehicle includes: a vehicle body; a driving unit that is swivelably mounted to the vehicle body; a caster that is swivelably mounted to the vehicle body; the towing device according to any one of the above-described aspects; and a control device for controlling the driving unit and the towing device. The automatic guided vehicle is configured to tow the cart with the hook member of the towing device engaged with the frame of the cart.

According to a preferred embodiment of the automatic guided vehicle according to the present disclosure, the towing of the cart is performed using the hook member of the towing device according to the present advancement as described in any one of the above aspects. Thus, the automatic guided vehicle can achieve the same effects as those achieved by the towing device according to the present advancement, for example, an effect of reliably towing the cart without detaching it even when vibrations in the up-down direction occur on the automatic guided vehicle and the cart. As a result, an improvement of the towing performance of the automatic guided vehicle can be achieved.

According to the automatic guided vehicle according to the present advancement, the automatic guided vehicle tows the cart in a state where the automatic guided vehicle is positioned under the cart.

According to the present embodiment, a space in a field where the automatic guided vehicle travels can be reduced because the automatic guided vehicle is to be positioned under the cart so that the entire vehicle length including the automatic guided vehicle and the cart can be reduced.

According to the automatic guided vehicle according to the present advancement, the automatic guided vehicle further includes a coupling member that is configured to be swingably coupled to the vehicle body, to extend toward the cart, the coupling member having an extended end. The towing device is mounted on the extended end.

According to the present embodiment, more remarkable effects of the present disclosure can be achieved in a configuration in which the towing is performed with the cart coupled to the rear part of the automatic guided vehicle.

According to the present advancement, there is provided a towing device of an automatic guided vehicle capable of reliably towing a cart without detaching it, even when vibrations in the up-down direction occur on the automatic guided vehicle and the cart.

BRIEF DESCRIPTION OF DRAWINGS

FIG. 14 illustrates a three-view drawing schematically illustrating a configuration of anti-back levers 228a, 228a.

DETAILED DESCRIPTION OF EMBODIMENT

Next, a best mode for carrying out the advancement is described with reference to an embodiment thereof.

Embodiment

Figure 1:
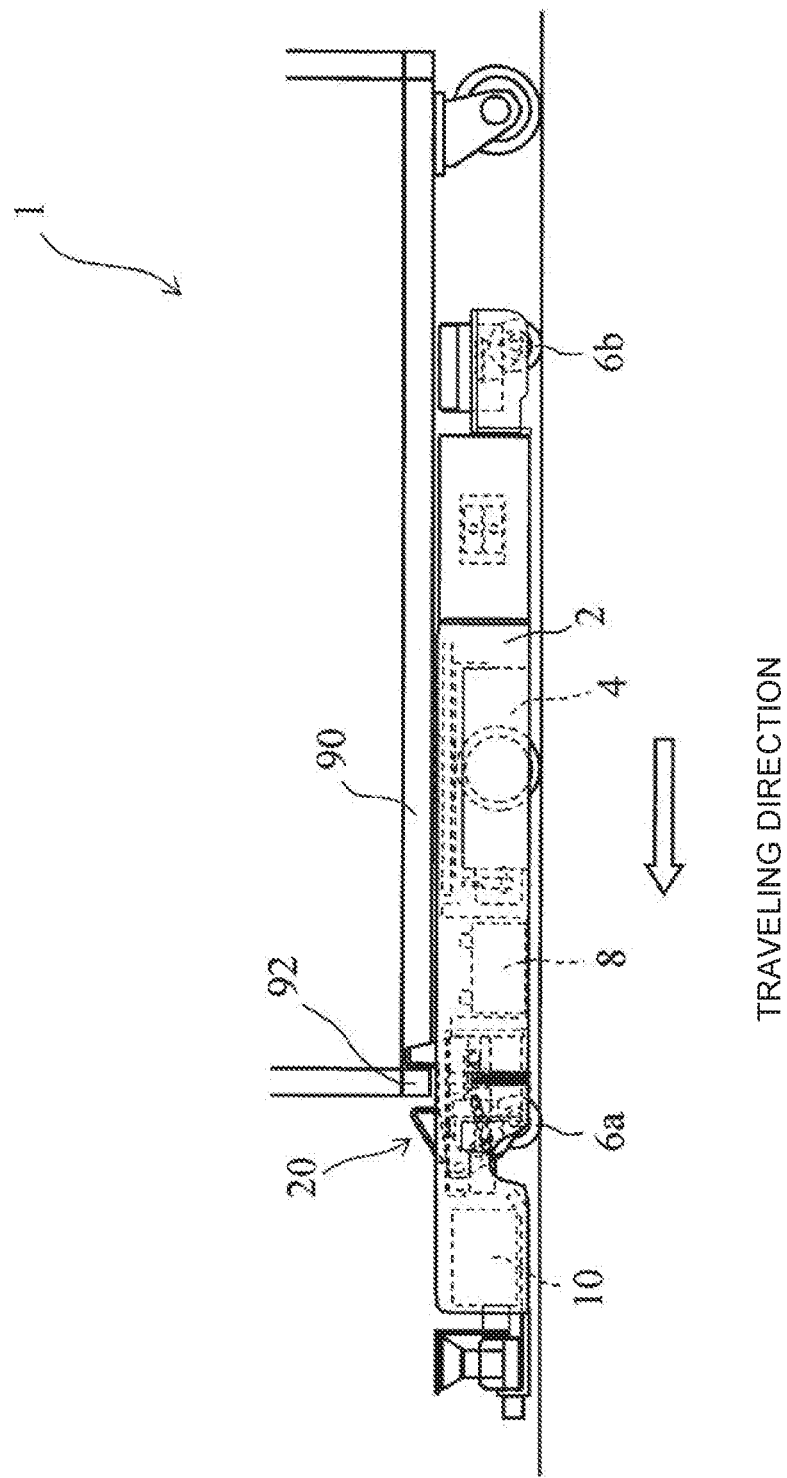
FIG. 1 is a schematic side view illustrating a configuration of an automatic guided vehicle 1 having a towing device 20 mounted thereon according to an embodiment of the present disclosure.

As illustrated in FIG. 1, an automatic guided vehicle 1 according to the present embodiment includes a vehicle body 2; a driving unit 4 swivelably mounted to the vehicle body 2; a pair of front casters 6a, 6a, one of which being provided at a front right position and the other being provided at a front left position in a traveling direction; a pair of rear casters 6b, 6b, one of which being provided at a rear right position and the other being provided at a rear left position in the traveling direction; a battery 8; a towing device 20 according to the present embodiment; and a control device 10 for controlling the entire automatic guided vehicle 1. As illustrated in FIG. 1, the automatic guided vehicle 1 according to the present embodiment is of a low-floor type. That is, the automatic guided vehicle 1 is to be positioned under a cart 90 to tow it. Note that, for convenience, the bottom side of FIG. 1 is defined as the "front side", and the top side of FIG. 1 is defined as the "rear side" in the present embodiment.

Figure 2:
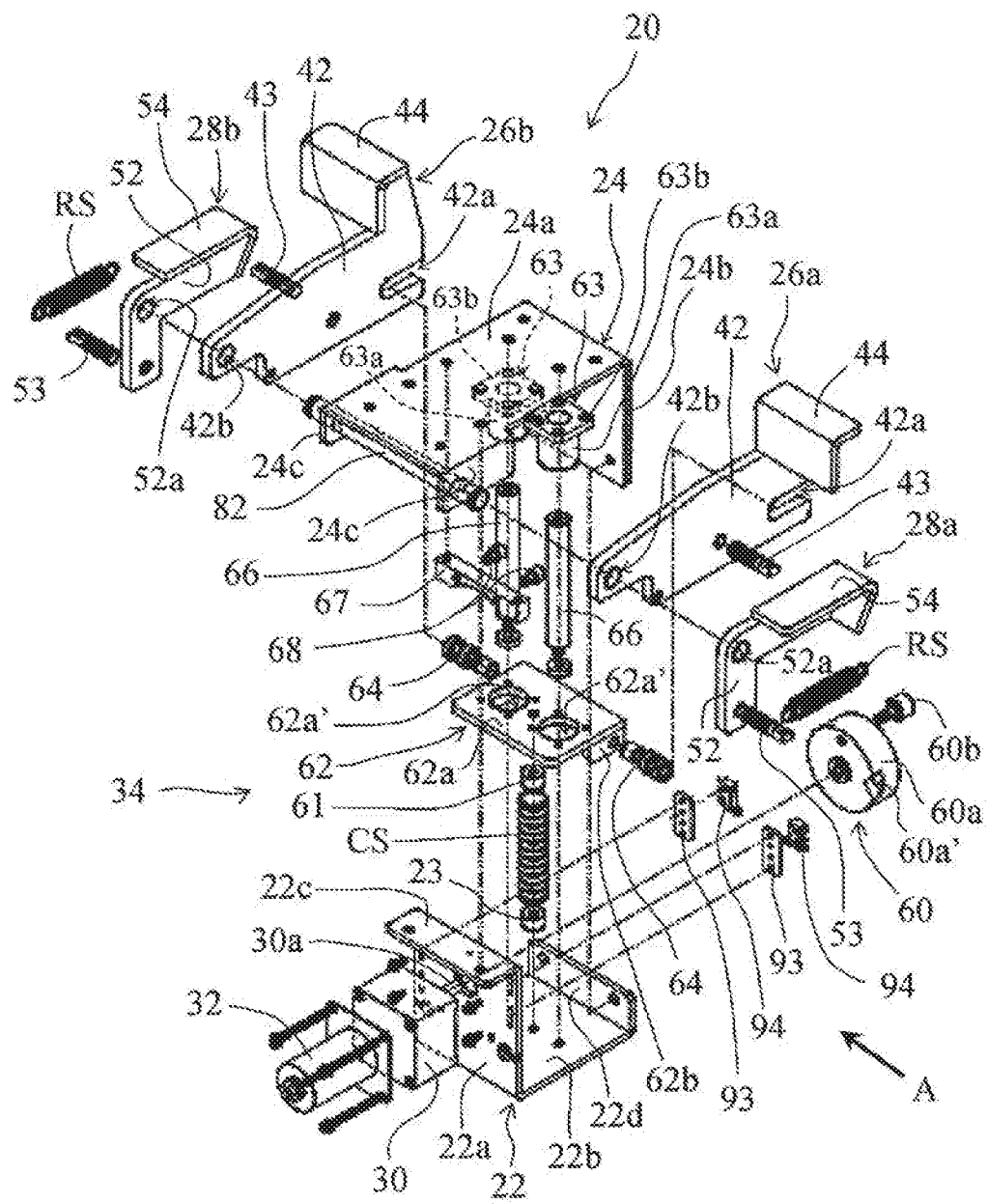
FIG. 2 is an exploded perspective view schematically illustrating a configuration of a towing device 20 according to the embodiment of the present advancement.
Figure 3:
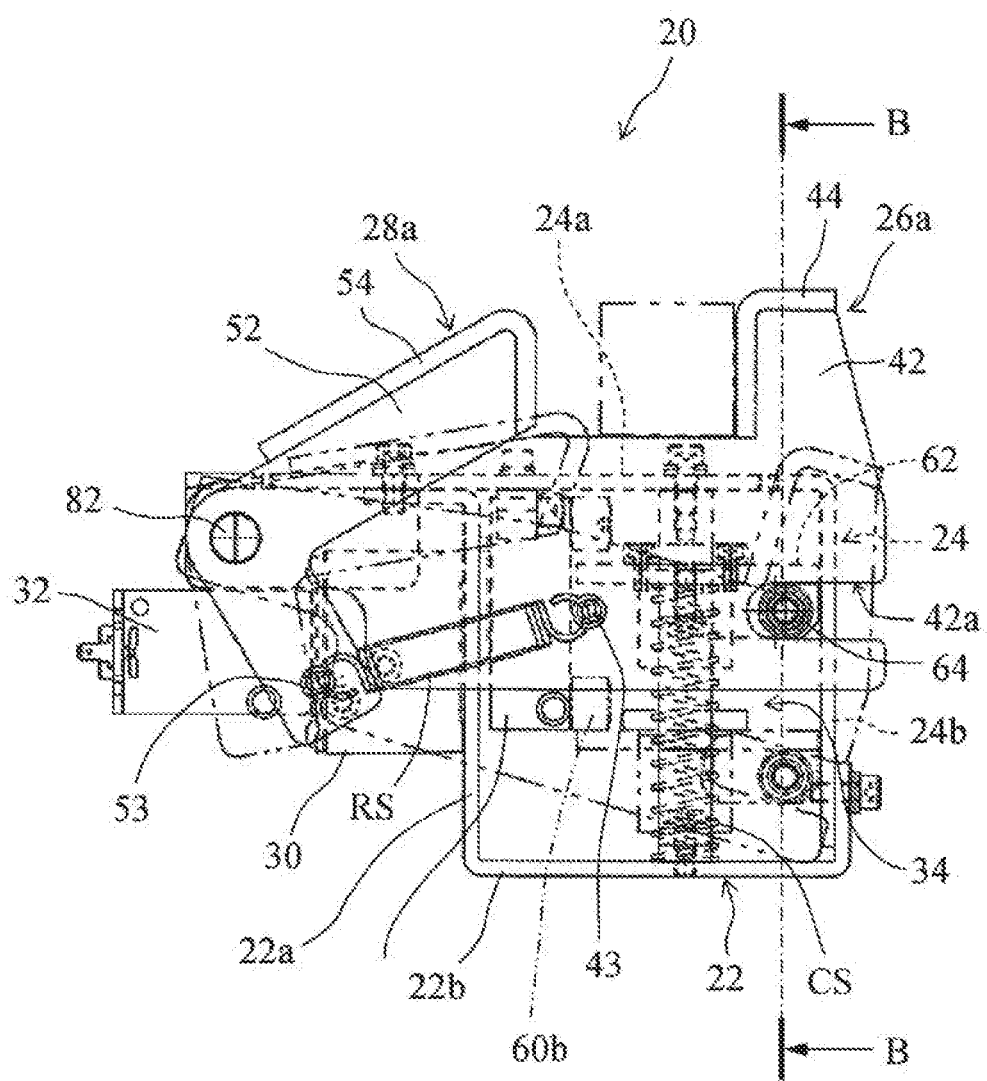
FIG. 3 is a side view of the towing device 20 according to the embodiment of the present advancement as viewed from the direction of the arrow A in FIG. 2.
Figure 4:
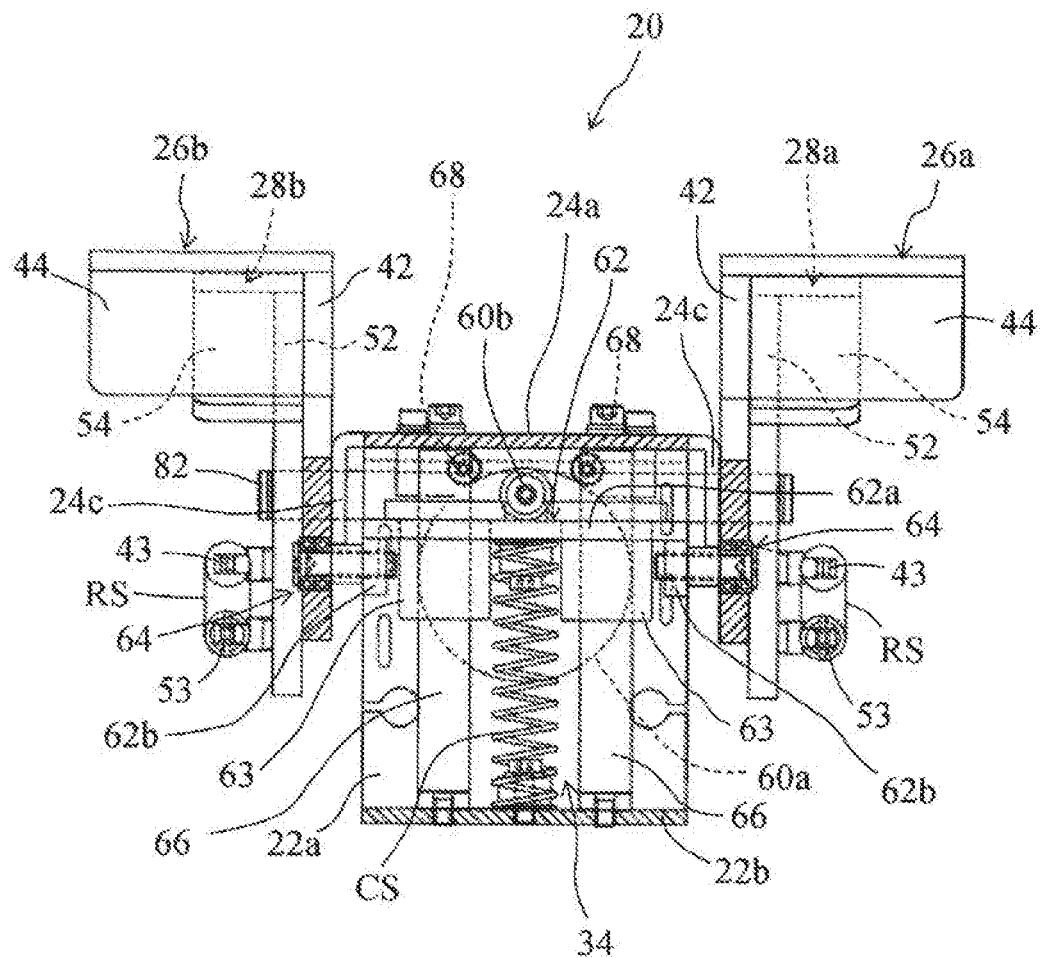
FIG. 4 is a cross-sectional view taken along the line B-B in FIG. 3.

As illustrated in FIGS. 2 to 4, the towing device 20 according to the present embodiment mainly includes a base plate 22 fixed on the vehicle body 2; an upper plate 24 attached to the base plate 22; a pair of hook levers 26a, 26b and a pair of anti-back levers 28a, 28b rotatably attached to the upper plate 24; a motor 32 attached to the base plate 22 via a reduction gear mechanism 30; and a movement direction conversion mechanism 34 for converting a rotational movement of the motor 32 into a vertical linear movement. As illustrated in FIG. 1, the towing device 20 is disposed between the front casters 6a, 6a.

The base plate 22 has a generally L-shape as viewed from the side, which is formed by bending a plate-like member such as a steel plate. As illustrated in FIG. 2, the base plate 22 has an attachment surface part 22a to which the reduction gear mechanism 30 and the like are attached, and a fastening surface part 22b integrally connected to one end of the attachment surface part 22a and fastened to the vehicle body 2. At the other end of the attachment surface part 22a (an end opposite to the connecting end of the attachment surface part 22a with the fastening surface part 22b), a bent piece part 22c extends in a direction opposite to the extension direction of the fastening surface part 22b extending from the connecting end. At the other end of the fastening surface part 22b opposite to the connecting end of the fastening surface part 22b with the attachment surface part 22a, a bent piece part 22d extends in the same direction as the extension direction of the attachment surface part 22a extending from the connecting end. As illustrated in FIG. 2, a support member 23 for guiding and supporting a lower part of a coil spring CS, which will be described later, is fastened to the fastening surface part 22b in a substantially center part thereof by a fastening member such as a bolt.

The base plate 22 is attached to the vehicle body 2 so that the normal of the attachment surface part 22a orients in a front-rear direction (the up-down direction in FIG. 1) of the automatic guided vehicle 1. As a result, axes of a rotational shaft (not illustrated) of the motor 32 supported by the base plate 22 and an output shaft 30a of the reduction gear mechanism 30 orient in the front-rear direction (the up-down direction in FIG. 1) of the automatic guided vehicle 1.

The upper plate 24 has a generally inverted L-shape as viewed from the side, which is formed by bending a plate-like member such as a steel plate. As illustrated in FIG. 2, the upper plate 24 has a top plate part 24a having a generally rectangular shape as viewed from the top, and a bent extension part 24b integrally connected to one longitudinal end of the top plate part 24a. The bent piece parts 24c, 24c extending in the same direction as the extension direction of the bent extension part 24b are formed at positions on respective long sides of the top plate part 24a closer to the other longitudinal end (closer to a side opposite to the side at which the bent extension part 24b is connected). An insertion hole (not illustrated) through which a support shaft 82 is inserted is formed in each of the bent piece parts 24c, 24c. The support shaft 82 is supported by the pair of bent piece parts 24c, 24c, with both axial ends of the support shaft 82 projecting from the insertion holes.

The upper plate 24 is attached to the base plate 22 by fastening the top plate part 24a to the bent piece part 22c of the base plate 22 and fastening the bent extension part 24b to the bent piece part 22d of the base plate 22 (see FIG. 2). Here, an accommodating space for accommodating the movement direction conversion mechanism 34 is formed between the top plate part 24a and the fastening surface part 22b.

As illustrated in FIGS. 2 and 3, the hook levers 26a, 26b (FIG. 3 illustrates only the hook lever 26a) respectively include an arm part 42 and an abutting part 44 integrally formed with the arm part 42. The arm part 42 is configured as a plate-like member having a generally L-shape as viewed from the side, having a long piece part and a short piece part. A notch 42a having a generally U-shape as viewed from the side is formed at one longitudinal end of the long piece part, that is, at an end to which the short piece part is connected. A through hole 42b is formed at the other longitudinal end of the long piece part, that is, at an end opposite to the end to which the short piece part is connected (see FIG. 2). Further, a support rod 43 for attaching and supporting a return spring RS, which will be described later, is threadedly engaged with the long piece part in substantially center part thereof.

The pair of hook levers 26a, 26b is an example of implementation corresponding to a "hook member" in the present disclosure. Further, the long piece part and the short piece part of the arm part 42 are examples of implementation corresponding to a "long handle part" and a "short handle part" in the present disclosure. Further, an aspect in which the notch 42a having a generally U-shape as viewed from the side is formed at one longitudinal end (the end to which the short piece part is connected) of the long piece part is an example of implementation corresponding to an aspect in which "the long handle part has a short-handle-side end part that is connected to the short handle part and that is engageable with the moving member" in the present disclosure.

As illustrated in FIG. 2, the abutting parts 44, 44 each have a generally inverted L-shape as viewed from the side, which are formed by bending plate-like members such as steel plates. Each abutting part 44 is integrally formed with the short piece part of the arm part 42 so that a mountain fold line of the abutting part 44 orients toward the other longitudinal end of the long piece part of the arm part 42 and projects from the main surface of the arm part 42 (see FIGS. 2 and 4). More specifically, as illustrated in FIGS. 2 and 4, each abutting parts 44 perpendicularly projects from the main surface of the arm part 42, where one end (the end opposite to the projecting end) in directions along the mountain fold line of the abutting part 44 is flush with the main surface of the arm part 42. Note that, as illustrated in FIGS. 2 and 4, the hook levers 26a, 26b have the same configuration with each other except that the abutting parts 44, 44 and the support rods 43, 43 of the hook levers 26a, 26b, respectively, extend in opposite directions to each other, that is, extend from the main surfaces of the arm parts 42, 42 in directions away from each other.

As illustrated in FIGS. 2 and 3, the anti-back levers 28a, 28b (FIG. 3 illustrates only the anti-back lever 28a) each include an arm part 52 and an abutting part 54 integrally formed with the arm part 52. The arm part 52 is configured as a plate-like member having a generally L-shape as viewed from the side, having a long piece part and a short piece part that is orthogonal to the long piece part. A through hole 52a (illustrated only in FIG. 2) is formed at an intersection of the long piece part and the short piece part of the arm part 52. Further, a support rod 53 for attaching and supporting the return spring RS, which will be described later, is threadedly engaged with one longitudinal end of the short piece part, that is, the end opposite to the side at which the long piece part is connected. The pair of anti-back levers 28a, 28b is an example of implementation corresponding to a "restricting member" in the present disclosure.

As illustrated in FIGS. 2 and 3, the abutting parts 54, 54 each have a generally inverted V-shape as viewed from the side, which are formed by bending plate-like members such as steel plates. Each abutting part 54 is integrally formed with the long piece part of the arm part 52 so that a mountain fold line orients opposite to the short piece part of the arm part 52 (to the right side in FIG. 3) and projects from the main surfaces of the arm part 52. More specifically, as illustrated in FIGS. 2 and 4, each abutting parts 54 perpendicularly projects from the main surface of the arm part 52, where one end (the end opposite to the projecting end) in directions along the mountain fold line of the abutting part 54 is flush with the main surface of the arm part 52. Note that, as illustrated in FIGS. 2 and 4, the anti-back levers 28a, 28b have the same configuration with each other except that the abutting parts 54, 54 and the support rods 53, 53 of the anti-back levers 28a, 28b, respectively, extend in opposite direction to each other, that is, extend from the main surfaces of the arm parts 52, 52 in directions away from each other.

As illustrated in FIG. 2, the movement direction conversion mechanism 34 includes a roller cam 60 fixed to the output shaft 30a of the reduction gear mechanism 30; a moving plate 62 that reciprocates in the vertical direction as the roller cam 60 rotates; a pair of bearing members 64 attached to the moving plate 62; a pair of guide rods 66, 66 for guiding the reciprocating movement of the moving plate 62; and a coil spring CS for biasing the moving plate 62 vertically upward. The coil spring CS is an example of implementation corresponding to a "spring member" in the present disclosure.

As illustrated in FIG. 2, the roller cam 60 includes a disk-shaped main body 60a attached to the output shaft 30a of the reduction gear mechanism 30 so as to be integrally rotatable with the output shaft 30a, and a roller 60b rotatably attached to a position offset from the center of the main body 60a. The roller cam 60 is driven by the motor 32 to rotate in a range of 180 degrees in a reciprocating manner. As a result, the roller 60b revolves about the center of the main body 60a from a top dead center (an upper position on the vertical line passing through the center of the main body 60a) to a bottom dead center (a lower position on the vertical line passing through the center of the main body 60a). The fact that the roller 60b has reached the top dead center or the bottom dead center is detected when a pair of limit switches 94, 94 comes into engagement with a notch part 60a' formed in the main body 60a. The pair of limit switches 94, 94 is attached to the attachment surface part 22a of the base plate 22 via brackets 93, 93.

As illustrated in FIG. 2, the moving plate 62 includes a main part 62a having a generally rectangular shape as viewed from the top and a pair of side wall parts 62b, 62b (FIG. 2 illustrates only one side wall part 62b) provided upright in a direction perpendicular to the main part 62a. As illustrated in FIG. 2, a pair of through holes 62a', 62a' is formed in the main part 62a. The through holes 62a', 62a' are arranged side by side in a longitudinal direction of the main part 62a. A support member 61 for guiding and supporting the upper part of the coil spring CS is fastened to a surface of the main part 62a on which the pair of side wall parts 62b, 62b is provided upright, by a fastening member such as a bolt. The support member 61 is disposed in a substantially center part between the centers of the through holes 62a', 62a'.

Note that, as illustrated in FIG. 4, a pair of bearing members 63, 63 is fastened to the moving plate 62 by fastening members such as bolts. As illustrated in FIG. 2, the bearing members 63, 63 respectively include cylindrical parts 63a, 63a and flange parts 63b, 63b. The pair of bearing members 63, 63 is respectively fastened to the main part 62a, with the cylindrical parts 63a, 63a inserted through the through holes 62a', 62a' from above (the upper side in FIGS. 2 and 4) and with the flange parts 63b, 63b abutted against the upper surface of the main part 62a.

Each of the side wall parts 62b, 62b is flush with one of long sides of the main part 62a and one of short sides (see FIG. 2), and extends from the one of the long sides of the main part 62a to a substantially center part of the short side (see FIG. 2). As illustrated in FIGS. 2 and 4, bearing members 64, 64 are respectively attached to the side wall parts 62b, 62b so that the bearing members 64, 64 project away from each other. Each of the bearing members 64, 64 has two ball bearings, one spacer, and a bolt supporting them. The two ball bearings are attached to each of the side wall parts 62b, 62b via the spacer with bolts.

As illustrated in FIG. 2, a female thread is formed in each of the guide rods 66, 66 along the axis thereof on one axial end (the upper side in FIG. 2), and a male thread part extending along the axis is formed on each of the guide rods 66, 66 on the other axial end (the lower side in FIG. 2).

A way of assembling the towing device 20 configured as described above is now described with reference to FIG. 2. First, the motor 32 is attached to the attachment surface part 22a of the base plate 22 via the reduction gear mechanism 30, and the roller cam 60 is fixed to the output shaft 30a of the reduction gear mechanism 30. Further, the pair of limit switches 94, 94, a guide block 67, and a pair of roller members 68, 68 are attached to the attachment surface part 22a of the base plate 22. Note that the guide block 67 and the pair of roller members 68, 68 are members that abut against an outer peripheral surface of the roller cam 60 to receive a vertical upward force acting on the roller cam 60.

Next, the lower part of the coil spring CS is fitted to the support member 23 attached to the fastening surface part 22b of the base plate 22, and the pair of guide rods 66, 66 is attached to the fastening surface part 22b via spacers. The attachment of the pair of guide rods 66, 66 to the fastening surface part 22b is performed by threadedly engaging the male thread parts formed on the pair of guide rods 66, 66 with the female thread parts formed on the fastening surface part 22b. Subsequently, the guide rods 66, 66 are respectively inserted through the bearing members 63, 63 and the upper part of the coil spring CS is fitted to the support member 61 to dispose a moving plate 62. At this time, the moving plate 62 is disposed so that the roller 60b of the roller cam 60 abuts against the upper surface of the moving plate 62.

Then, the upper plate 24 is disposed to cover them from above (the upper side in FIG. 2). The upper parts of the guide rods 66, 66 are fixed to the upper plate 24 by fastening members such as bolts, and the top plate part 24a and the bent extension part 24b of the upper plate 24 are fastened to the bent piece parts 22c, 22c of the base plate 22, respectively.

Then, the hook levers 26a, 26b are arranged to sandwich the upper plate 24 from the right-left direction, and the anti-back levers 28a, 28b are arranged to sandwich the hook levers 26a, 26b from the right-left direction. In this state, the insertion holes in the bent piece parts 24c, 24c of the upper plate 24, the through holes 42b, 42b in the arm parts 42, 42 of the hook levers 26a, 26b, and the through holes 52a, 52a in the arm parts 52, 52 of the anti-back levers 28a, 28b are aligned to each other to insert the support shaft 82 through the insertion holes, the through holes 42b, 42b, and the through holes 52a, 52a. Thus, the pair of hook levers 26a, 26b and the pair of anti-back levers 28a, 28b are rotatably attached to the upper plate 24.

Finally, the return springs RS, RS are respectively attached to the support rods 43, 43 attached to the hook levers 26a, 26b and the support rods 53, 53 attached to the anti-back levers 28a, 28b to couple the pair of hook levers 26a, 26b and the pair of anti-back levers 28a, 28b with the return springs RS, RS. In this way, the assembly of the towing device 20 is completed. Note that, as illustrated in FIG. 3, the short piece parts of the anti-back levers 28a, 28b are respectively always located closer to the support rods 43, 43 with respect to the vertical direction, that is, always pulled counterclockwise about the support shaft 82 by the return springs RS, RS. The abutting parts 54, 54 are thus inverted in an inclined manner with respect to the horizontal direction, together with the long piece parts of the arm part 52, 52.

The towing device 20 assembled in this way is attached to the vehicle body 2 of the automatic guided vehicle 1 so that the motor 32 is located on the front side of the automatic guided vehicle 1 with respect to the roller cam 60. As a result, the abutting parts 54, 54 of the anti-back levers 28a, 28b are respectively disposed in front of the abutting parts 44, 44 of the hook levers 26a, 26b.

Next, an operation of the automatic guided vehicle 1 having the towing device 20 configured in this way mounted thereon, in particular, an operation of engaging the towing device 20 with the frame 92 of the cart 90 is described. When the automatic guided vehicle 1 tows the cart 90, the automatic guided vehicle 1 is positioned under the cart 90 from behind the cart 90, as illustrated in FIG. 1. At this time, as illustrated in FIG. 5, the drive of the towing device 20 is controlled so that the pair of hook levers 26a, 26b does not project above a top plate 2a of the vehicle body 2 (FIG. 5 illustrates only the hook lever 26a).

Figure 5:
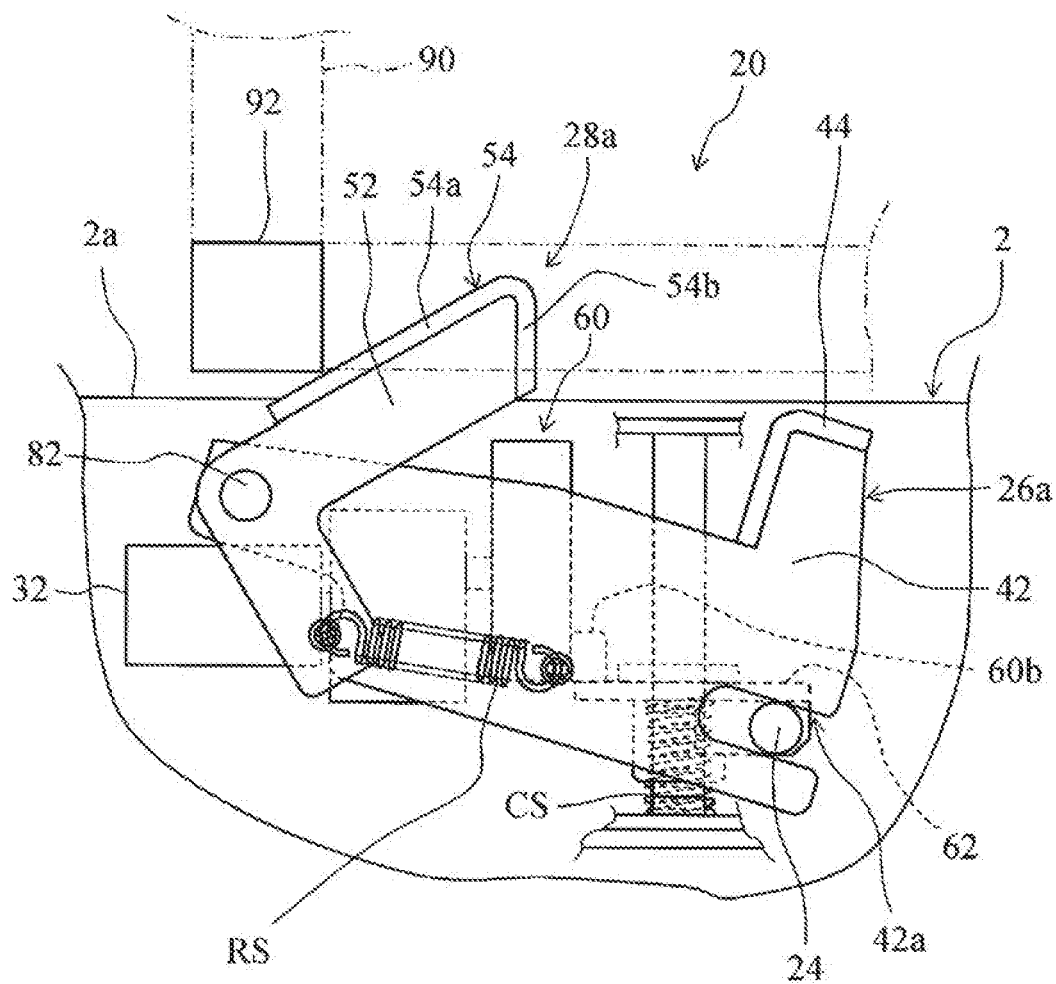
FIG. 5 is a view explaining how the towing device 20 according to the embodiment of the present advancement engages with a frame 92 of a cart 90.

More specifically, as illustrated in FIG. 5, the drive of the motor 32 is controlled by the control device 10 so that the roller 60b of the roller cam 60 is brought to the lower dead center, thereby moving the moving plate 62 vertically downward against a spring force of the coil spring CS. As the moving plate 62 moves vertically downward, the hook levers 26a, 26b are respectively rotated clockwise about the support shaft 82 via the bearing members 64, 64 to keep the hook levers 26a, 26b away from projecting above the top plate 2a of the vehicle body 2. Note that the guide block 67 and the pair of roller members 68, 68 abut against the upper outer circumferential surface of the roller cam 60 to effectively prevent a bending stress due to the spring force of the coil spring CS acting on the roller cam 60 from acting on the output shaft 30a of the reduction gear mechanism 30 as the moving plate 62 is moved vertically downward.

Here, as illustrated in FIG. 5, the short piece parts of the anti-back levers 28a, 28b are respectively always located closer to the support rods 43, 43 with respect to the vertical direction, that is, always pulled counterclockwise about the support shaft 82 by the return springs RS, RS. Thus, the abutting parts 54, 54, together with the long piece parts of the arm parts 52, 52, project above the top plate 2a of the vehicle body 2 (FIG. 5 illustrates only the anti-back lever 28a).

As a result, as illustrated in FIG. 5, the long piece parts 54a, 54a of the abutting parts 54, 54 extending along the longitudinal direction of the arm parts 52, 52 each form an inclined surface slanting upward from the front side to the rear side in the traveling direction of the automatic guided vehicle 1. On the other hand, the short piece parts 54b, 54b of the abutting parts 54, 54 extending along one longitudinal ends of the arm parts 52, 52 each form a steep wall surface generally parallel to the vertical direction.

Figure 6:
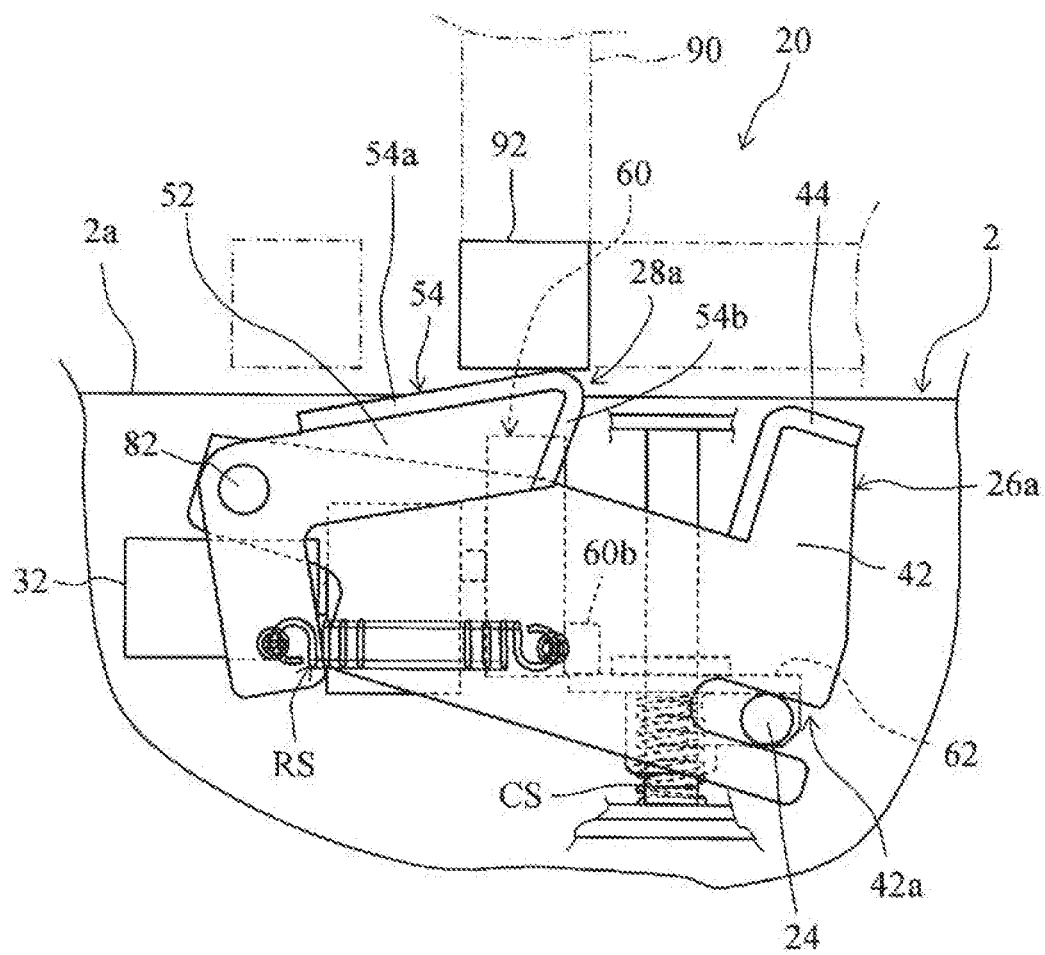
FIG. 6 is a view explaining how the towing device 20 according to the embodiment of the present advancement engages with the frame 92 of the cart 90.

As the automatic guided vehicle 1 under the cart 90 travels forward in such a state, the frame 92 of the cart 90 abuts against the long piece parts 54a, 54a of the abutting parts 54, 54, as illustrated in FIG. 5. As the automatic guided vehicle 1 further travels forward in this state, the frame 92 of the cart 90 moves rearward while pushing the pair of anti-back levers 28a, 28b downward, as illustrated in FIG. 6. In other words, the anti-back levers 28a, 28b are rotated clockwise by the frame 92 of the cart 90 against spring forces of the return springs RS, RS, respectively (FIG. 6 illustrates only the anti-back lever 28a). Note that the frame 92 of the cart 90 can be smoothly moved rearward because the long piece parts 54a, 54a of the abutting parts 54, 54 each forms an inclined surface slanting upward from the front side to the rear side in the traveling direction of the automatic guided vehicle 1.

Figure 7:
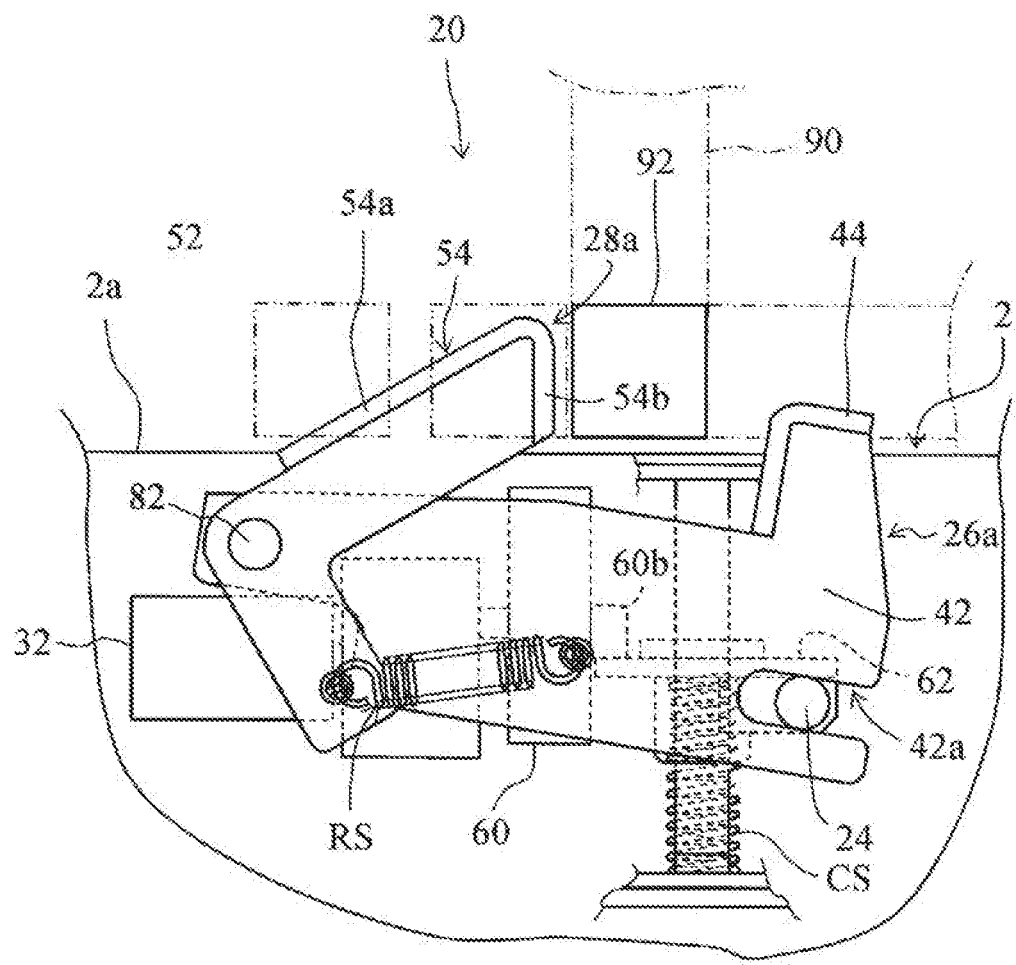
FIG. 7 is a view explaining how the towing device 20 according to the embodiment of the present advancement engages with the frame 92 of the cart 90.

Further, as illustrated in FIG. 7, during the rearward movement of the frame 92 of the cart 90 while abutting against the long piece parts 54a, 54a of the abutting parts 54, 54, the drive of the motor 32 is controlled by the control device 10 so that the roller 60b of the roller cam 60 is brought to the top dead center, thereby moving the moving plate 62 vertically upward. As a result, the hook levers 26a, 26b are rotated counterclockwise about the support shaft 82 so that the abutting parts 44, 44 of the hook levers 26a, 26b begin to project above the top plate 2a of the vehicle body 2 (FIG. 7 illustrates only the hook lever 26a).

Figure 8:
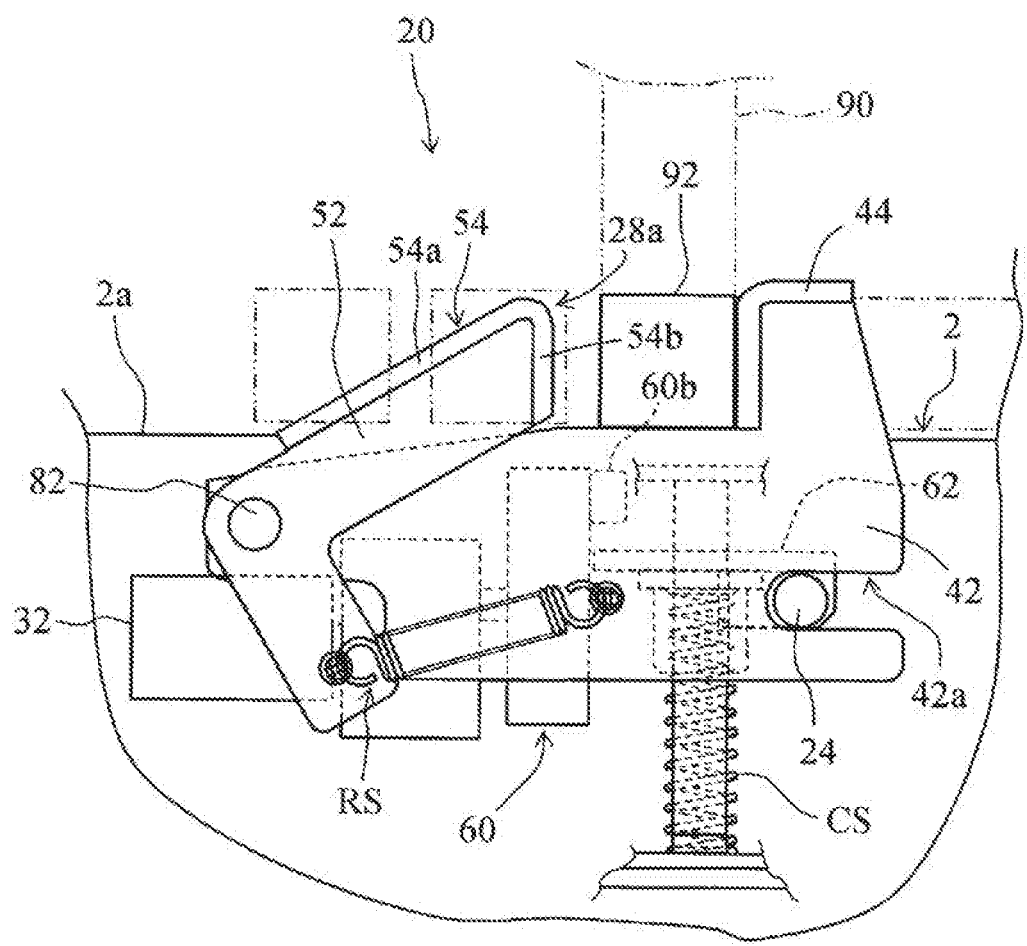
FIG. 8 is a view explaining how the engagement of the towing device 20 according to the embodiment of the present advancement with the frame 92 of the cart 90 is completed.

As illustrated in FIG. 8, when the roller 60b of the roller cam 60 reaches the top dead center, the engagement between the towing device 20 and the frame 92 of the cart 90 is completed. Here, the pair of hook levers 26a, 26b is configured so that the arm parts 42, 42 of the hook levers 26a, 26b abut against the frame 92 before the roller 60b of the roller cam 60 reaches the top dead center (in FIG. 8, a gap is formed between the roller 60b, which has rotated to the top dead center, and the moving plate 62). Therefore, the pair of hook levers 26a, 26b is engaged with the frame 92, with the coil spring CS biasing the pair of hook levers 26a, 26b. Thus, even when the automatic guided vehicle 1 towing the cart 90 travels on a bumpy road that causes vibrations on the automatic guided vehicle 1 and the cart 90 in the up-down direction, a disengagement of the pair of hook levers 26a, 26b from the frame 92 can be effectively prevented. As a result, the automatic guided vehicle 1 can reliably tow the cart 90 without detaching it. Note that the reduction gear mechanism 30, the motor 32, the movement direction conversion mechanism 34, the roller cam 60, and the moving plate 62 are examples of implementation corresponding to "driving devices" in the present disclosure.

When the cart 90 continues to travel forward due to inertia after the automatic guided vehicle 1 stops traveling forward, the frame 92 of the cart 90 can abut from the rear side against the pair of anti-back levers 28a, 28b, more specifically, the short piece parts 54b, 54b of the abutting parts 54, 54 each constituting a steep wall surface, thereby preventing coasting of the cart 90. Furthermore, also when the automatic guided vehicle 1 travels rearward, the short piece parts 54b, 54b of the abutting parts 54, 54 each constituting the steep wall surface abut against the frame 92 of the cart 90. This can achieve a reliable towing of the cart 90 without detaching it.

In order to release the towing of the cart 90 by the automatic guided vehicle 1, the control device 10 controls the drive of the motor 32 to move the moving plate 62 vertically downward so that the roller 60b of the roller cam 60 is brought to the bottom dead center; then, the hook levers 26a, 26b are respectively rotated clockwise about the support shaft 82 via the bearing members 64, 64 and thereafter the automatic guided vehicle 1 is traveled forward.

Figure 9:
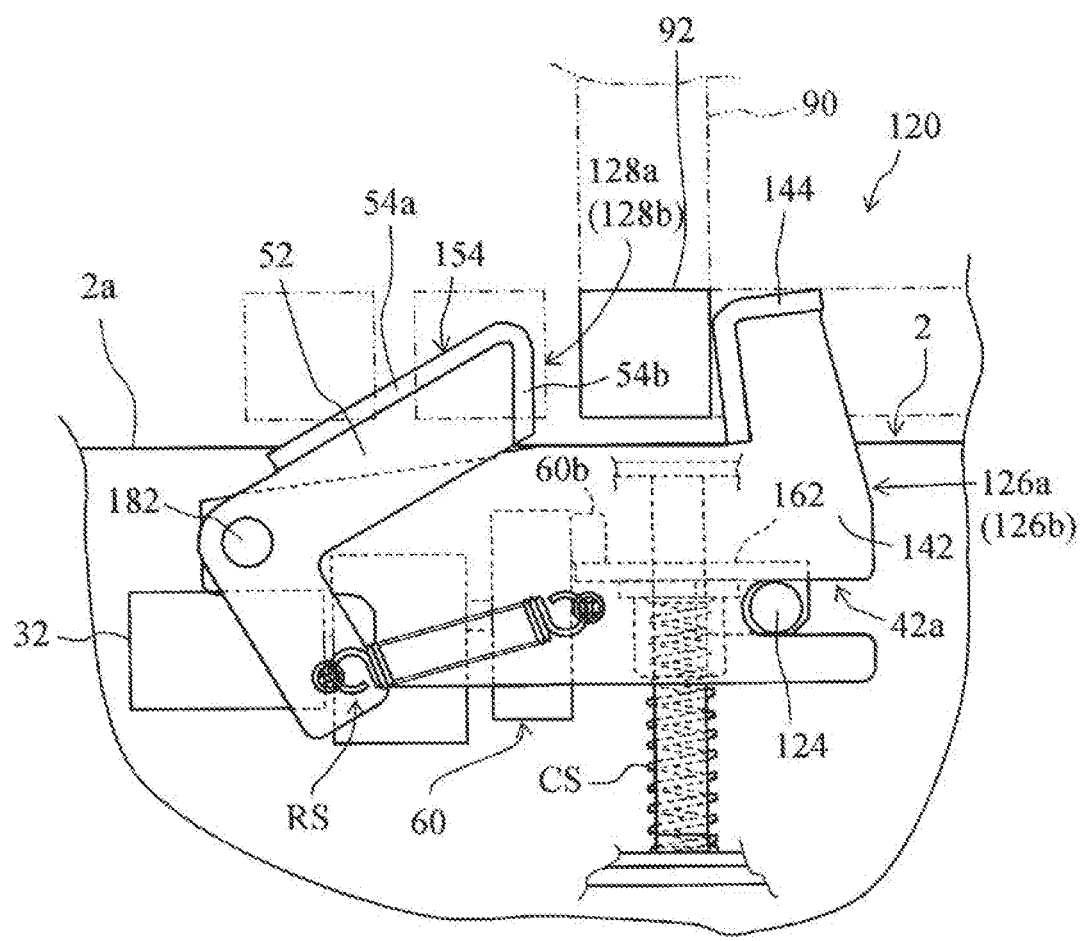
FIG. 9 is a view explaining how a towing device 120 according to a modification engages with the frame 92 of the cart 90.
Figure 10:
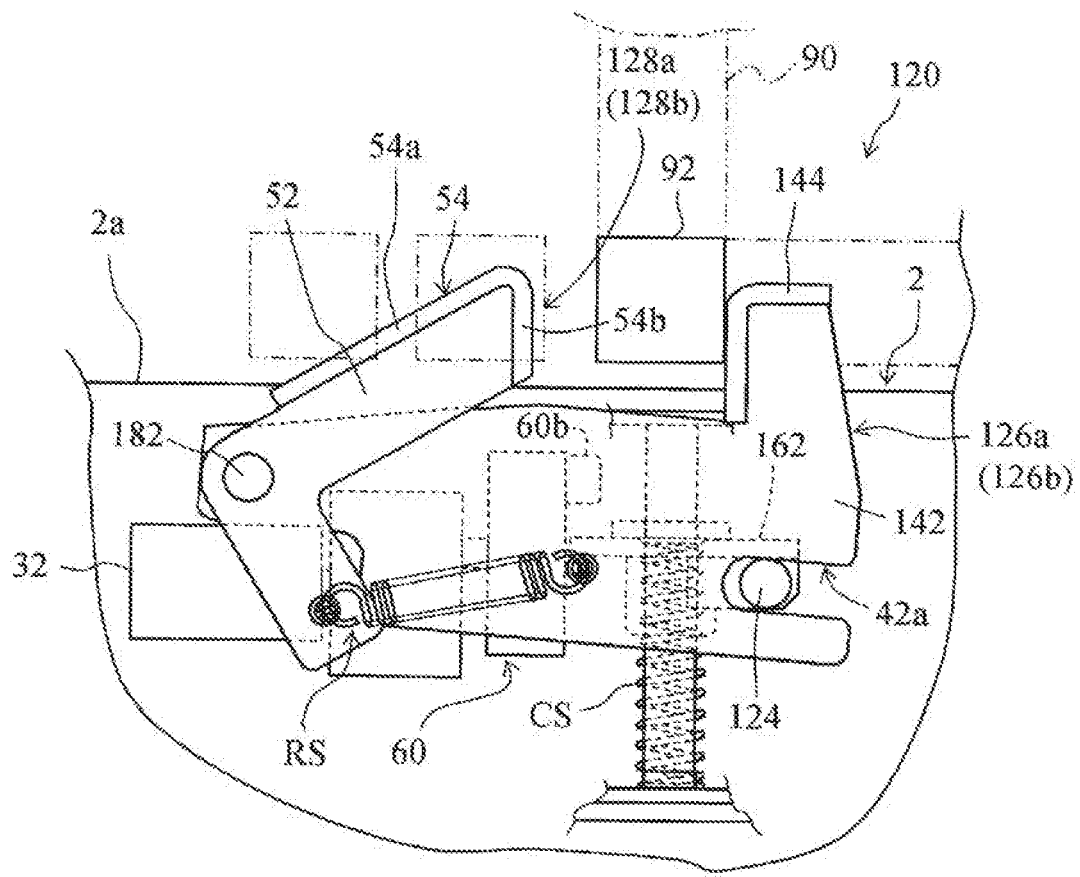
FIG. 10 is a view explaining how the engagement of the towing device 120 according to the modification with the frame 92 of the cart 90 is completed.

In the present embodiment, the abutment of the arm parts 42, 42 of the hook levers 26a, 26b against the frame 92 before the roller 60b of the roller cam 60 reaches the top dead center allows the hook levers 26a, 26b to be engaged with the frame 92 with the coil spring CS biasing the hook levers 26a, 26b; however, the disclosure is not limited to this configuration. For example, a towing device 120 in a modification illustrated in FIG. 9 can be used. In the towing device 120, the short piece parts of the arm parts 142, 142 of the hook levers 126a, 126b and the abutting parts 144, 144 provided on the short piece parts each have an inclined angle so as to be closer to the frame 92 of the cart 90 (or the abutting parts 154, 154 of the anti-back lever 128a, 128b) toward distal ends thereof (the upper side in FIG. 9). When the abutting parts 144, 144 engage with the frame 92, the abutting parts 144, 144 are in line contact with the frame 92. When the automatic guided vehicle 1 tows the cart 90, as illustrated in FIG. 10, the pair of hook levers 126a, 126b rotates clockwise about the support shaft 182 by a rotating moment due to towing forces acting on abutting portions between the abutting parts 144, 144 and the frame 92 until the abutting parts 144, 144 are in plane contact with the frame 92 (FIGS. 9 and 10 illustrate only the pair of hook levers 126a).

With the clockwise rotation of the pair of hook levers 126a, 126b about the support shaft 182, the moving plate 162 is moved vertically downward via the pair of bearing members 124, 124 so that the coil spring CS is compressed. Therefore, the pair of hook levers 126a, 126b is engaged with the frame 92, with a spring force caused by the compression of the coil spring CS being applied to the pair of hook levers 126a, 126b. As a result, even when the automatic guided vehicle 1 towing the cart 90 travels on a bumpy road that causes vibrations on the automatic guided vehicle 1 and the cart 90 in the up-down direction, a disengagement of the pair of hook levers 126a, 126b from the frame 92 can be effectively prevented. Thus, the towing device 120 according to the modification can also reliably tow the cart 90 without detaching it. Here, the pair of hook levers 126a, 126b is an example of implementation corresponding to a "hook member" in the present disclosure and the pair of anti-back levers 128a, 128b is an example of implementation corresponding to a "restricting member" in the present disclosure.

In the present embodiment, the automatic guided vehicle 1 is to be positioned under the cart 90 and engages the towing device 20 with the frame 92 of the cart 90 to tow the cart 90. However, as in an automatic guided vehicle 200 according to a modification illustrated in FIG. 11, the cart 90 can be towed by attaching a towing device 220 according to a modification to a coupling bar 272, which is coupled to the automatic guided vehicle 200, to engage the towing device 220 with the frame 92 of the cart 90.

Figure 11:
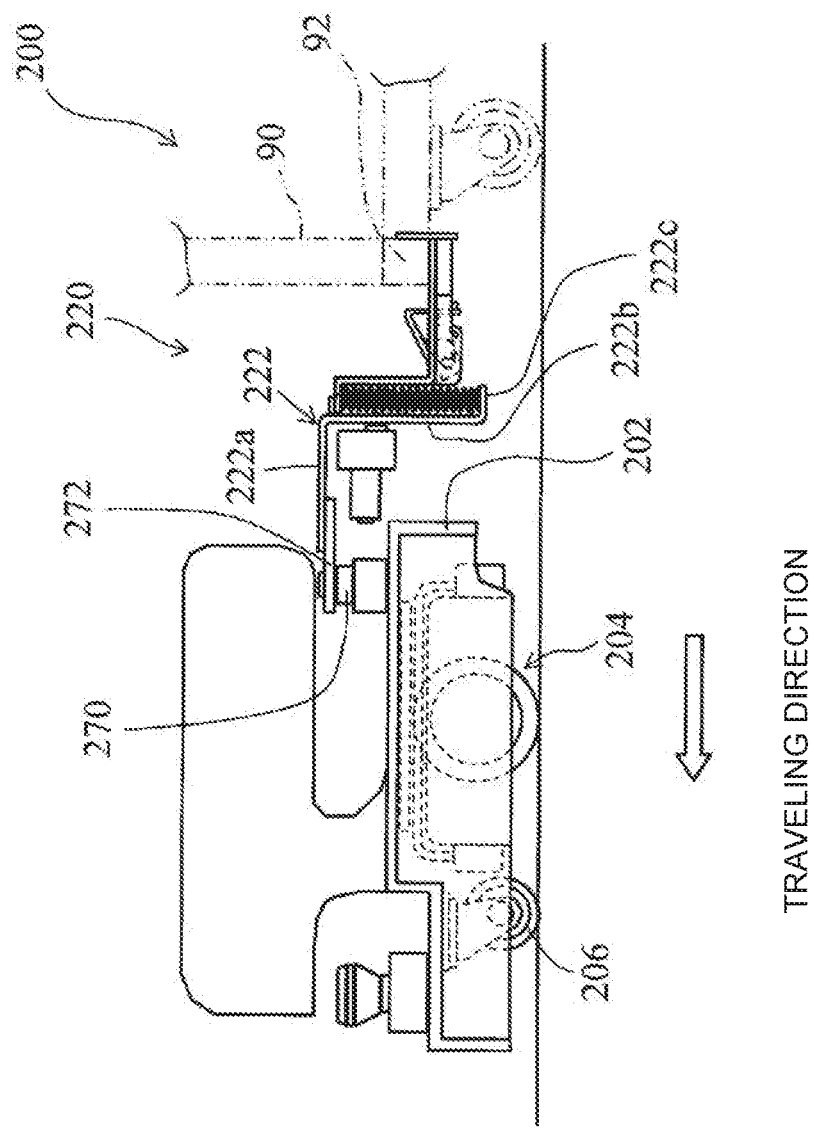
FIG. 11 is a schematic side view illustrating a configuration of an automatic guided vehicle 200 having a towing device 220 mounted thereon according to a modification.

As illustrated in FIG. 11, the automatic guided vehicle 200 according to the modification includes a vehicle body 202; a driving unit 204 swivelably mounted to the vehicle body 2; a pair of front casters 206, 206, one of which being provided at a front right position and the other being provided at a front left position in a traveling direction; a battery (now illustrated), the towing device 220 according to the modification; and a control device (now illustrated) for controlling the entire automatic guided vehicle 200. A coupling shaft 270 is provided at a rear part of the vehicle body 202, and a coupling bar 272 is rotatably attached to the coupling shaft 270. The coupling bar 272 is an example of implementation corresponding to a "coupling member" in the present disclosure.

Figure 12:
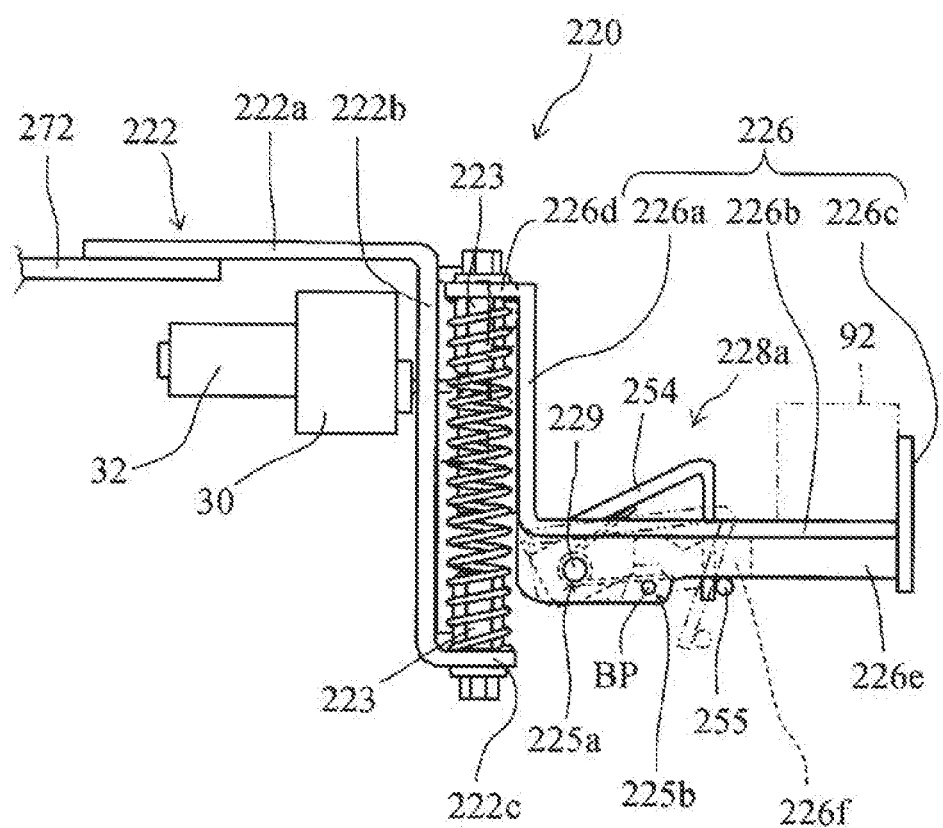
FIG. 12 is a side view of the towing device 220 according to the modification as viewed from the side.
Figure 13:
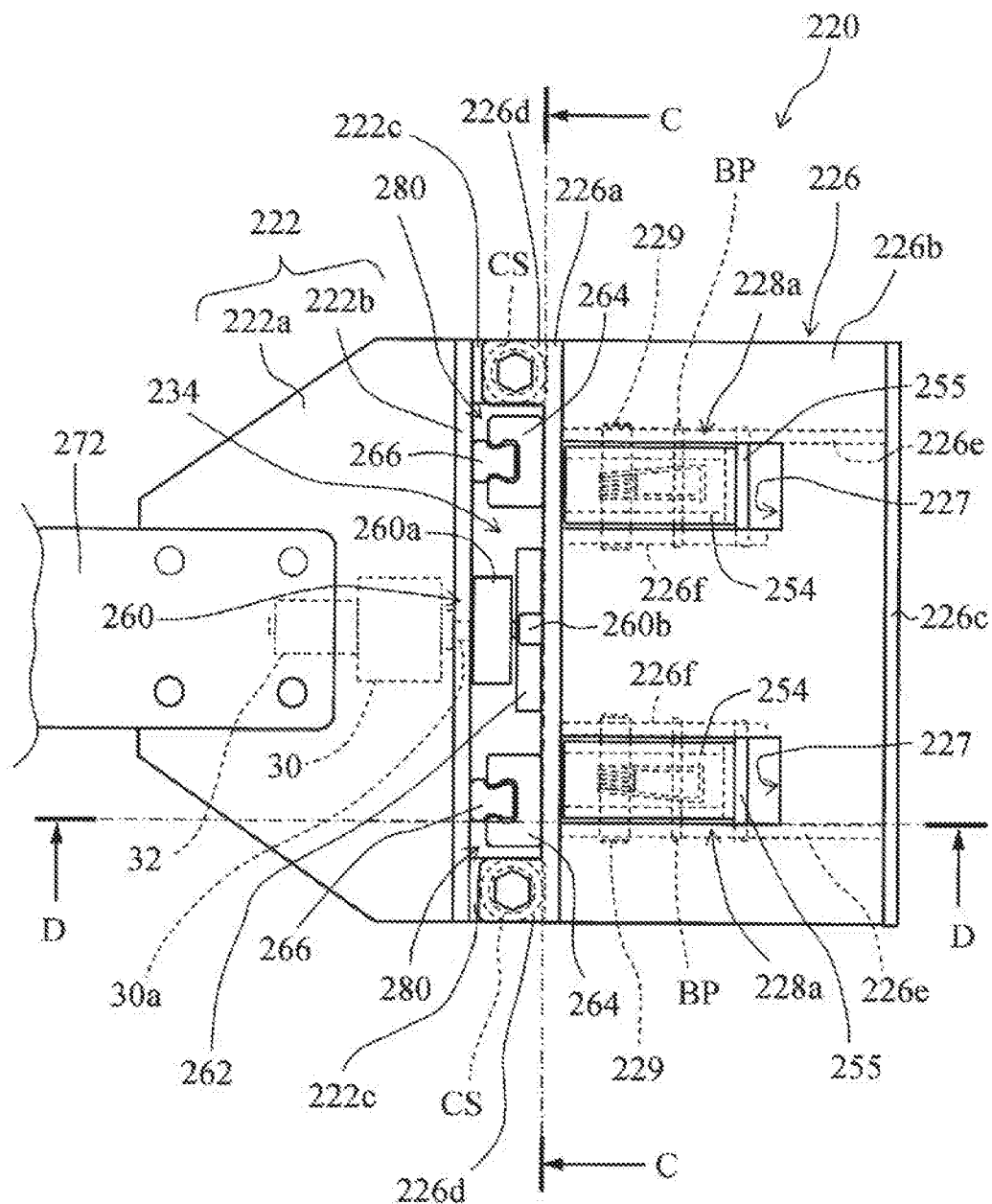
FIG. 13 is a plan view of a towing device 220 according to the modification, as viewed from above.

As illustrated in FIGS. 12 and 13, the towing device 220 according to the modification mainly includes a base plate 222 fixed to the coupling bar 272; a hook plate 226 attached to the base plate 222 via linear bearing mechanisms 280 (illustrated only in FIG. 13); a pair of anti-back levers 228a, 228a (FIG. 12 illustrates only one anti-back lever 228a) attached to the hook plate 226 in a projecting/retracting manner; a motor 32 attached to the base plate 222 via a reduction gear mechanism 30; and a movement direction conversion mechanism 234 (illustrated only in FIG. 13) for converting a rotational movement of the motor 32 into a vertical linear movement.

The base plate 222 has a generally L-shape as viewed from the side, which is formed by bending a plate-like member such as a steel plate. As illustrated in FIGS. 12 and 13, the base plate 222 has a horizontal surface part 222a extending in the horizontal direction and a vertical surface part 222b integrally connected to one end of the horizontal surface part 222a and extending in the vertical direction. The horizontal surface part 222a has a generally trapezoid shape in a plan view as viewed from above. A coupling bar 272 is fastened to the other end of the horizontal surface part 222a (an end opposite to the connecting end of the horizontal surface part 222a with the vertical surface part 222b).

As illustrated in FIGS. 12 and 13, a pair of bent piece parts 222c, 222c is formed at an end opposite to the connecting end of the vertical surface part 222b with the horizontal surface part 222a. The pair of bent piece parts 222c, 222c extends in a direction opposite to the extension direction of the horizontal surface part 222a extending from the connecting end. As illustrated in FIG. 13, the bent piece parts 222c, 222c are respectively provided at both ends in a width direction of the vertical surface part 222b (a direction (the up-down direction in FIG. 13) orthogonal to both the extension direction of the horizontal surface part 222a (the right-left direction in FIG. 13) and the extension direction of the vertical surface part 222b (the direction perpendicular to the sheet of FIG. 12)). As illustrated in FIG. 12, a support member 223 for guiding and supporting a lower part of a coil spring CS, which will be described later, is fastened to each of the bent piece parts 222c, 222c by a fastening member such as a bolt.

As illustrated in FIG. 11, the base plate 222 configured in this way is fastened to the coupling bar 272 so that the horizontal surface part 222a is located on the vertical upper side and the bent piece parts 222c, 222c are located on the vertical lower side.

The hook plate 226 has a generally L-shape as viewed from the side, which is formed by bending a plate-like member such as a steel plate. As illustrated in FIG. 12, the hook plate 226 has a vertical surface part 226a extending in the vertical direction, a bent extension part 226b integrally connected to one end in the extension direction of the vertical surface part 226a (the up-down direction in FIG. 12), and a hook part 226c connected at a right angle to the bent extension part 226b at an end opposite to the connecting portion of the bent extension part 226b with the vertical surface part 226a. The hook plate 226 is an example of implementation corresponding to a "hook member" and a "moving member" in the present disclosure.

Bent piece parts 226d, 226d are respectively provided at both ends in a width direction (a direction (perpendicular to the sheet of FIG. 12) orthogonal to both the extension direction (the up-down direction in FIG. 12) of the vertical surface part 226a and the extension direction (the right-left direction in FIG. 12) of the bent extension part 226b) of an end opposite to a side at which the bent extension part 226b is connected. As illustrated in FIG. 12, a support member 223 for guiding and supporting a lower part of a coil spring CS, which will be described later, is fastened to each of the bent piece parts 226d, 226d by a fastening member such as a bolt.

As illustrated in FIG. 13, a pair of notched openings 227, 227, each having a generally rectangular shape as viewed from the top, is formed in the bent extension part 226b. The pair of notched openings 227, 227 extend from the connecting portion of the vertical surface part 226a with the bent extension part 226b toward the hook part 226c. As illustrated in FIG. 12, pairs of wall parts 226e, 226f are provided in the bent extension part 226b so as to project in a direction opposite to the extension direction of the vertical surface part 226a (the upward direction in FIG. 12). As illustrated in FIG. 13, each pair of wall parts 226e, 226f is provided so that the wall parts 226e, 226f sandwich one of the notched openings 227, 227.

Each wall part 226e extends from the connecting portion of the bent extension part 226b with the vertical surface part 226a to the hook part 226c, and each wall part 226f has the substantially same length as the longitudinal length of the respective notched opening 227. As illustrated in FIG. 12, through holes 225a, 225a respectively penetrating through the wall parts 226e, 226f are formed at portions of the wall parts 226e, 226f closer to the vertical surface part 226a. Further, through holes 225b, 225b having smaller diameters than those of the through holes 225a, 225a are formed at positions slightly closer to the through holes 225a, 225a than the center parts in the longitudinal direction (the right-left direction in FIG. 12) of the wall parts 226e, 226f and below the through holes 225a, 225a, as illustrated in FIG. 12.

Figure 14:
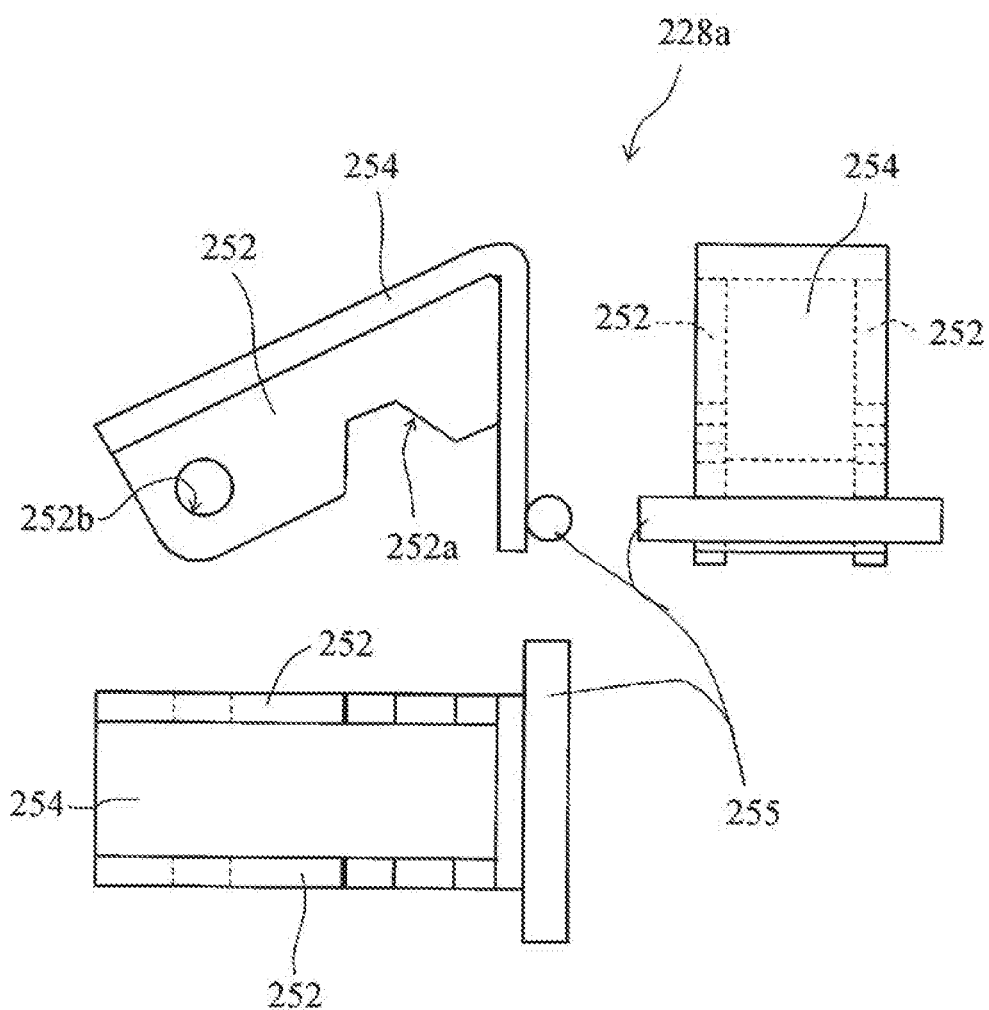

As illustrated in FIG. 14, the anti-back levers 228a, 228a each include a pair of arm parts 252, 252 and an abutting part 254 integrally formed with the pair of arm parts 252, 252. Each of the arm parts 252, 252 is configured as a plate-like member having a generally trapezoidal shape as viewed from the side, having a notch 252a formed in a shorter base of the trapezoid (hereinafter referred to as an "upper base"; a longer base of the trapezoid is referred to as a "lower base"). Further, a through hole 252b is formed at one longitudinal end of each of the arm parts 252, 252 (at a portion closer to one of legs of the trapezoid intersecting both the upper base and lower base at a generally right angle).

As illustrated in FIG. 14, the abutting parts 254, 254 each have a generally inverted V-shape as viewed from the side, which are formed by bending plate-like members such as steel plates. Each abutting part 254 is joined to the lower base and an inclined leg (a leg of the trapezoids intersecting the upper bases at an obtuse angle and intersecting the lower bases at an acute angle) of the respective arm part 252. A cylindrical stopper pin 255 is integrally attached to a distal end of a portion of each abutting part 254 connected to the inclined leg of the respective arm part 252. Note that the stopper pin 255 is attached to the abutting part 254 so that the axis of the stopper pin 255 extend in a direction orthogonal to the extension direction of the portion of the abutting part 254 connected to the inclined leg of the respective arm part 252.

The anti-back levers 228a, 228a configured in this way are rotatably supported by the bent extension part 226b by respectively inserting the support shafts 229, 229 through the through holes 252b, 252b and through holes 225a, 225a in a state where the anti-back levers 228a, 228a are respectively arranged in the notched openings 227, 227 of the bent extension part 226b so that the through holes 252b, 252b of the arm parts 252, 252 align with the through holes 225a, 225a of the wall parts 226e, 226f.

Figure 16:
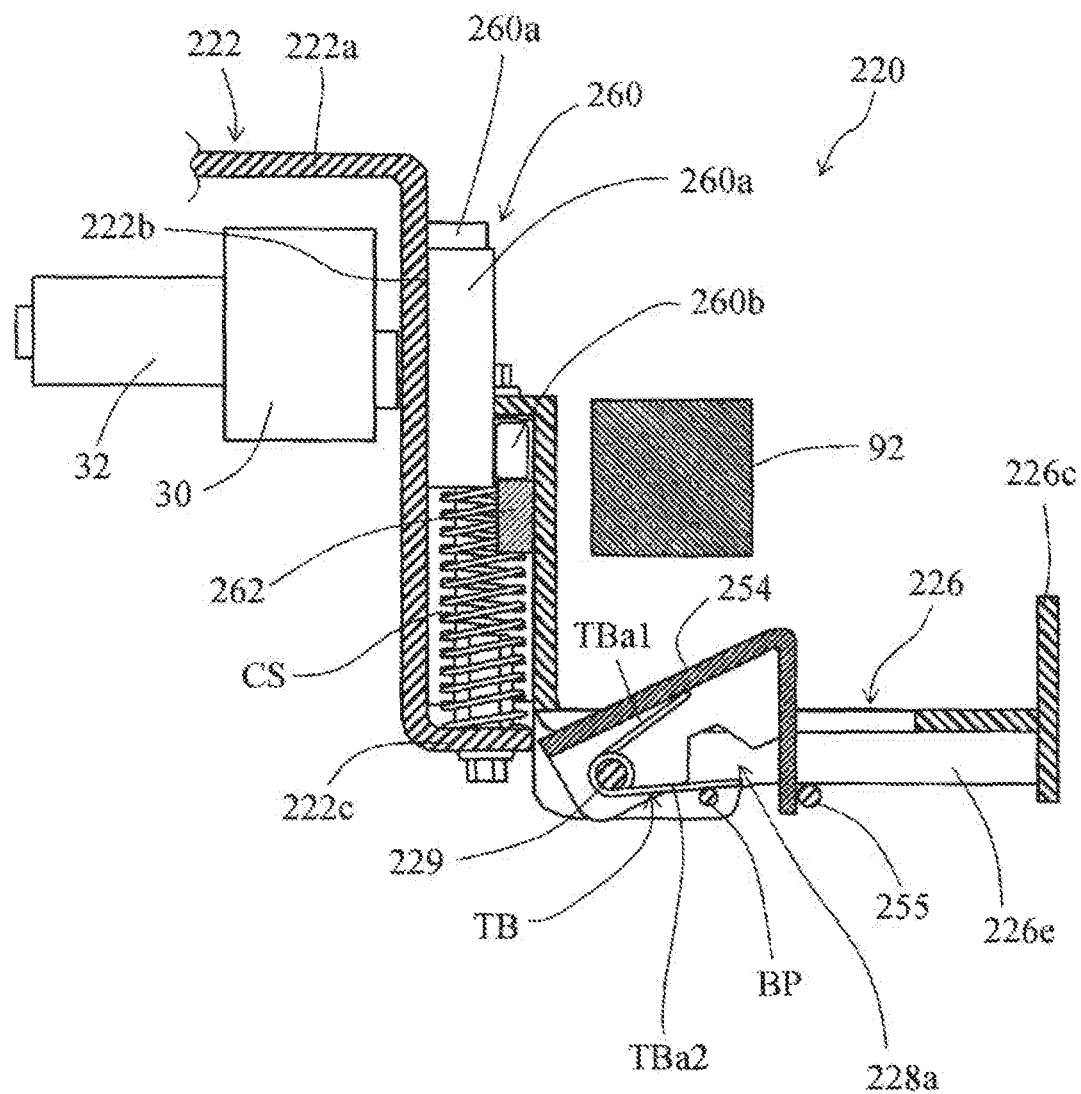
FIG. 16 is a cross-sectional view taken along the line D-D in FIG. 13, explaining how the towing device 220 according to the modification engages with the frame 92 of the cart 90.

At this time, a torsion spring TB is supported between the arm parts 252, 252 of each anti-back lever 228a by the respective support shaft 229. One arm TBa1 of each torsion spring TB abuts to the abutting part 254 as illustrated in FIG. 16, and the other arm TBa2 abuts to a spring stopper pin BP inserted through the through holes 225b, 225b of the wall parts 226e, 226f as illustrated in FIG. 16.

As a result, the anti-back levers 228a, 228a are urged by the torsion springs TB so that the abutting parts 254, 254 project above (see FIG. 12) the upper surface of the bent extension part 226b, as illustrated in FIG. 12. More specifically, a portion of each abutting part 254 along the lower bases of the arm parts 252, 252 forms an inclined surface slanting upward from the front side (the left side in FIG. 12) to the rear side (the right side in FIG. 12) in the traveling direction of the automatic guided vehicle 200. On the other hand, a portion of each abutting part 254 along the inclined legs of the arm parts 252, 252 forms a steep wall surface generally parallel to the vertical direction. Note that projection amounts of the abutting parts 254, 254 from the upper surface of the bent extension part 226b are restricted by the respective stopper pins 255, 255 integrated with the abutting parts 254, 254. More specifically, projection amounts of the abutting parts 254, 254 from the upper surface of the bent extension part 226b are restricted by the respective stopper pins 255, 255 each abutting against the wall parts 226e, 226f.

As illustrated in FIG. 13, the movement direction conversion mechanism 234 includes a roller cam 260 fixed to the output shaft 30a of the reduction gear mechanism 30; a block member 262 attached to the vertical surface part 226a of the hook plate 226; a pair of linear bearings 264, 264 attached to the vertical surface part 226a of the hook plate 226; and a pair of rail members 266, 266 guiding a reciprocating movement of the linear guide bearings 264, 264; and coil springs CS biasing the hook plate 226 vertically upward. The pair of linear bearings 264, 264 and the pair of rail members 266, 266 constitute the pair of linear bearing mechanisms 280.

Figure 15:
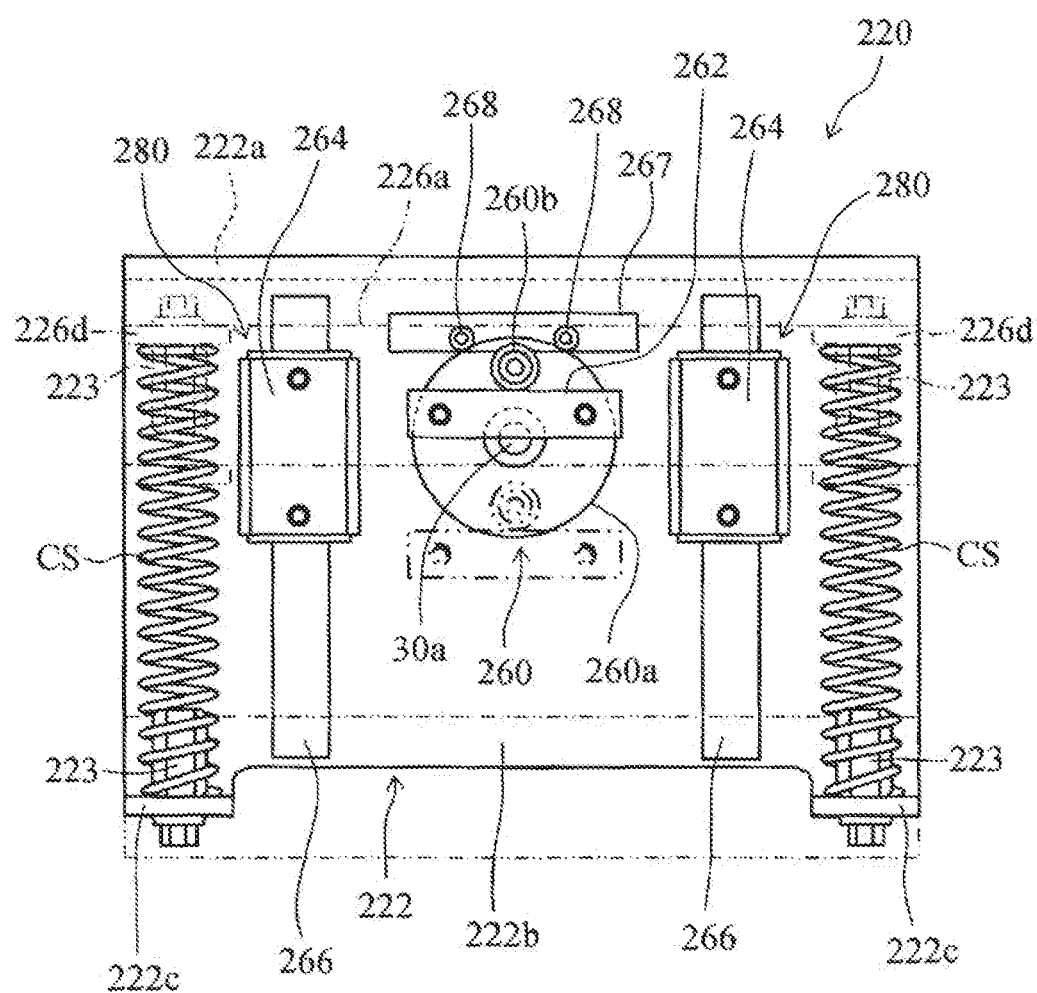
FIG. 15 is a cross-sectional view taken along the line C-C in FIG. 13.

As illustrated in FIGS. 13 and 15, the roller cam 260 includes a disk-shaped main body 260a attached to the output shaft 30a of the reduction gear mechanism 30 so as to be integrally rotatable with the output shaft 30a, and a roller 260b rotatably attached to a position offset from the center of the main body 260a. The roller cam 260 is driven by the motor 32 to rotate in a range of 180 degrees in a reciprocating manner. As a result, the roller 260b revolves about the center of the main body 260a from a top dead center (an upper position on the vertical line passing through the center of the main body 260a) to a bottom dead center (a lower position on the vertical line passing through the center of the main body 260a). The fact that the roller 260b has reached the top dead center or the bottom dead center is detected when a pair of limit switches (not illustrated) comes into engagement with a notch part (not illustrated) formed in the main body 260a.

A way of assembling the towing device 220 configured as described above is now described with reference to FIGS. 12, 13, and 15. First, the motor 32 is attached to the horizontal surface part 222a of the base plate 222 via the reduction gear mechanism 30, and the roller cam 260 is fixed to the output shaft 30a of the reduction gear mechanism 30.

Further, the pair of rail members 266, a guide block 267, and a pair of roller members 268, 268 are attached to the vertical surface part 222b of the base plate 222 by fastening members such as bolts (not illustrated) (see FIG. 15). Here, the guide block 267 and the pair of roller members 268, 268 are members which abut against an outer peripheral surface of the roller cam 260 to receive a vertical upward force acting on the roller cam 260.

Next, the pair of linear bearings 264, 264 and the block member 262 are attached by fastening members such as bolts (not illustrated) to the vertical surface part 226a of the hook plate 226 to which the pair of anti-back levers 228a, 228a is attached. Next, the hook plate 226 is assembled to the base plate 222 in such a manner that the lower parts of the coil springs CS, CS are fit to the support members 223, 223 attached to the bent piece parts 222c, 222c of the base plate 222; the support members 223, 223 attached to the bent piece parts 226d, 226d of the hook plate 226 are fit to the upper parts of the coil springs CS, CS; and the linear bearings 264, 264 are respectively inserted through the rail members 266, 266. Thus, the assembly of the towing device 220 is completed (see FIGS. 12, 13, and 15). Note that, in assembling the hook plate 226 to the base plate 222, the roller 260b of the roller cam 260 is disposed to abut against the upper surface of the block member 262 (see FIG. 16).

The towing device 220 assembled in this way is connected to the vehicle body 202 of the automatic guided vehicle 200 by fastening the horizontal surface part 222a of the base plate 222 to the coupling bar 272. At this time, the pair of anti-back levers 228a, 228a is disposed in front of the hook part 226c.

Next, an operation of the automatic guided vehicle 200 having the towing device 220 configured in this way mounted thereon, in particular, an operation of engaging the towing device 220 with the frame 92 of the cart 90 is described. In coupling the automatic guided vehicle 200 and the cart 90, the automatic guided vehicle 200 is moved rearward (traveled in the upward direction in FIG. 12) from the front of the cart 90. At this time, as illustrated in FIG. 16, the drive of the towing device 220 is controlled so that the hook part 226c and the pair of anti-back levers 228a, 228a do not project above the lower surface of the frame 92 of the cart 90.

More specifically, as illustrated in FIG. 16, the drive of the motor 32 is controlled by the control device (not illustrated) so that the roller 260b of the roller cam 260 is brought to the lower dead center, thereby moving the hook plate 226 vertically downward against a spring force of the coil spring CS via the block member 262. At this time, because the hook plate 226 is guided by the linear bearing mechanisms 280 (see FIG. 15), the hook plate 226 can stably move vertically downward. Note that the guide block 267 and the pair of roller members 268, 268 abut against the upper outer circumferential surface of the roller cam 260 (see FIG. 15) to effectively prevent a bending stress due to the spring force of the coil spring CS acting on the roller cam 260 from acting on the output shaft 30a of the reduction gear mechanism 30 as the hook plate 226 is moved vertically downward.

In this state, the automatic guided vehicle 200 is traveled rearward (traveled in the right direction in FIG. 16) toward the cart 90, and the rearward travel of the automatic guided vehicle 200 is stopped when the frame 92 of the cart 90 moves to a position above the pair of anti-back levers 228a, 228a. Then, as illustrated in FIG. 17, the automatic guided vehicle 200 is traveled forward (traveled in the left direction in FIG. 17) while the drive of the motor 32 is controlled by a control device (not illustrated) to move the hook plate 226 vertically upward so that the roller 260*b* of the roller cam 260 is brought to the top dead center.

Figure 17:
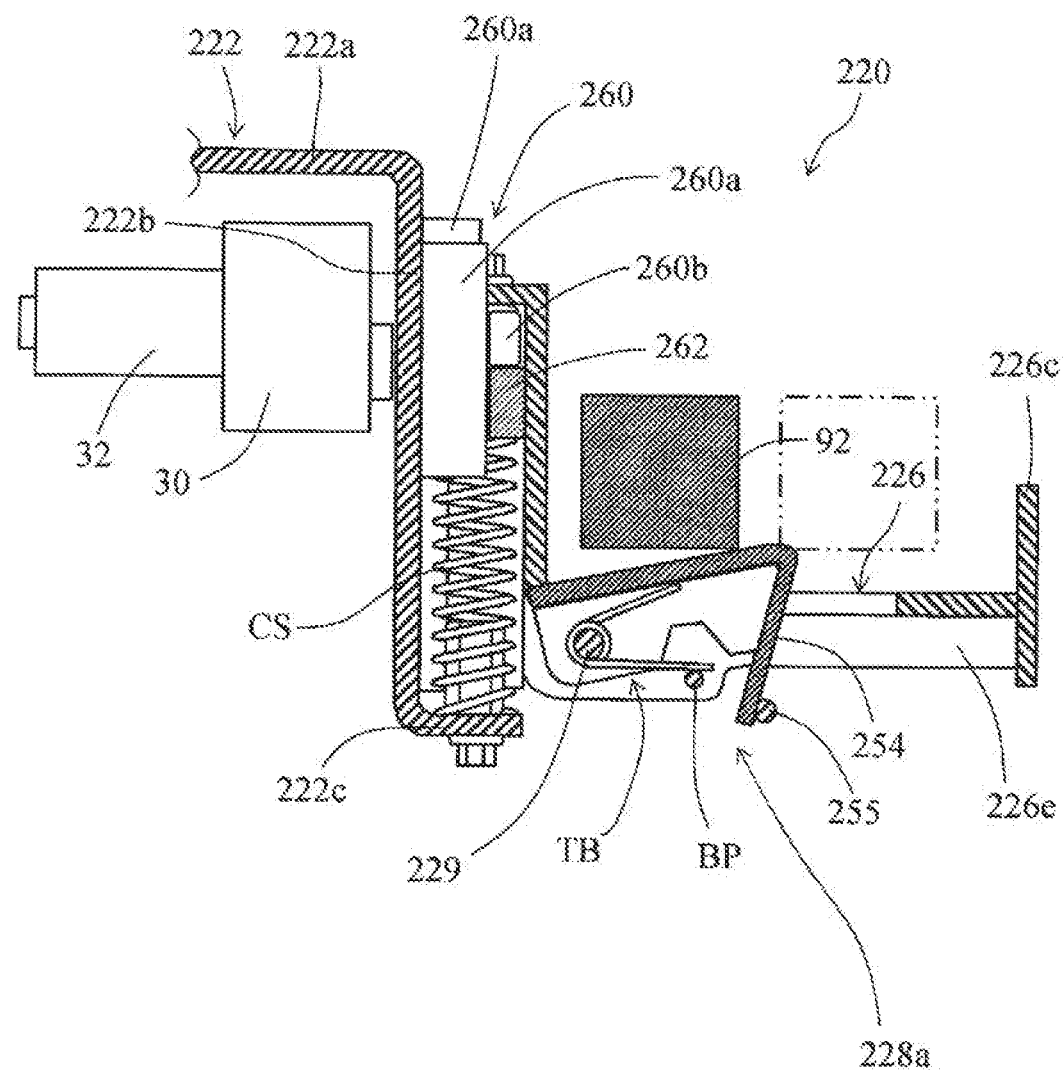
FIG. 17 is a cross-sectional view taken along the line D-D in FIG. 13, explaining how the towing device 220 according to the modification engages with the frame 92 of the cart 90.

At this time, as illustrated in FIG. 17, the frame 92 of the cart 90 abuts against the abutting parts 254, 254, more specifically, portions of the abutting parts 254, 254 along the lower bases of the arm parts 252, 252 and then moves rearward while pushing the portions downward. In other words, the anti-back levers 228*a*, 228*a* are rotated clockwise about the support shafts 229, 229 by the frame 92 of the cart 90 against spring forces of the torsion springs TB, TB, respectively. Note that the frame 92 of the cart 90 can be smoothly moved rearward because the portions of the abutting parts 254, 254 along the lower bases of the arm parts 252, 252 each form an inclined surface slanting upward from the front side to the rear side in the traveling direction of the automatic guided vehicle 200.

Figure 18:
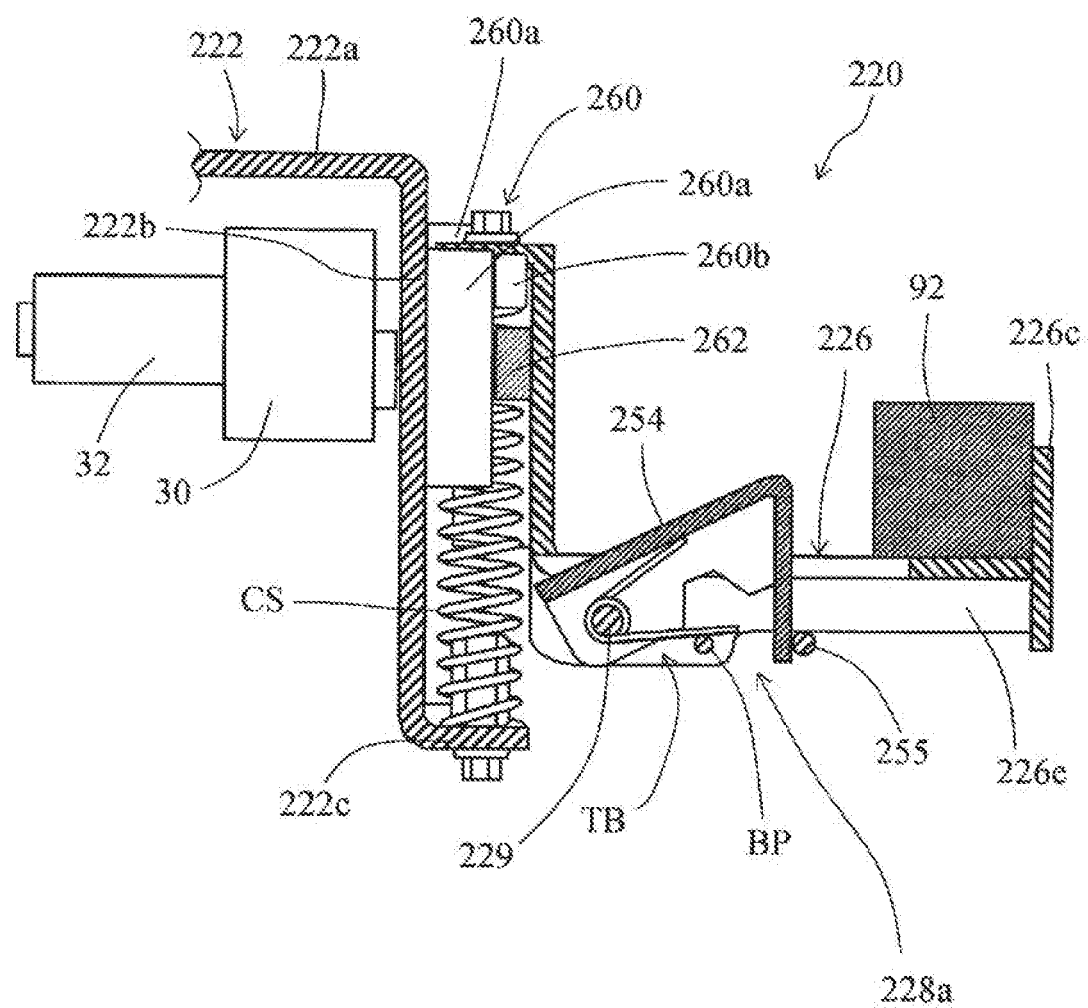
FIG. 18 is a cross-sectional view taken along the line D-D illustrating how the engagement of the towing device 220 according to the modification with the frame 92 of the cart 90 is completed.

Then, as illustrated in FIG. 18, when the roller 260*b* of the roller cam 260 reaches the top dead center, the engagement between the towing device 220 and the frame 92 of the cart 90 is completed. Here, the hook plate 226 is configured to abut against the frame 92 before the roller 260*b* of the roller cam 260 reaches the top dead center (in FIG. 18, a gap is formed between the roller 260*b*, which has rotated to the top dead center, and the hook plate 226). Therefore, the hook plate 226 is engaged with the frame 92 with the coil spring CS biasing the hook plate 226. As a result, even when the automatic guided vehicle 200 towing the cart 90 travels on a bumpy road that causes vibrations on the automatic guided vehicle 200 and the cart 90 in the up-down direction, a disengagement of the pair of hook plates 226 from the frame 92 can be effectively prevented. As a result, the automatic guided vehicle 200 can reliably tow the cart 90 without detaching it.

When the cart 90 continues to travel forward due to inertia after the automatic guided vehicle 200 stops traveling forward, the frame 92 of the cart 90 can abut from the rear side against the pair of anti-back levers 228*a*, 228*a*, more specifically, the abutting parts 254, 254 each constituting a steep wall surface, thereby preventing coasting of the cart 90. Furthermore, also when the automatic guided vehicle 200 travels rearward, the abutting parts 254, 254 each constituting the steep wall surfaces abut against the frame 92 of the cart 90. This can achieve a reliable towing of the cart 90 without detaching it. Note that the reduction gear mechanism 30, the motor 32, the movement direction conversion mechanism 234, the roller cam 260, and the block member 262 are examples of implementation corresponding to "driving devices" in the present disclosure.

In order to release the towing of the cart 90 by the automatic guided vehicle 200, the control device controls the drive of the motor 32 to move the hook plate 226 vertically downward so that the roller 260*b* of the roller cam 260 is brought to the bottom dead center; then, the engagement of the hook plate 226 with the frame 92 of the cart 90 is released and thereafter the automatic guided vehicle 200 is traveled forward.

The present embodiment illustrates one example of a mode for carrying out the present advancement. Thus, the present advancement is not limited to the configuration of the present embodiment. The relationship between components of the present embodiment and components of the present advancement is described below.

REFERENCE SIGNS LIST 1 automatic guided vehicle (automatic guided vehicle)
2 vehicle body (vehicle body)
2*a* top plate
4 driving unit (driving unit)
6*a* front caster (caster)
6*b* rear caster (caster)
8 battery
10 control device (control device)
20 towing device (towing device)
22 base plate
22*a* attachment surface part
22*b* fastening surface part
22*c* bent piece part
22*d* bent piece part
23 support member
24 upper plate
24*a* top plate part
24*b* bent extension part
24*c* bent piece part
26*a* hook lever (hook member)
26*b* hook lever (hook member)
28*a* anti-back lever (restricting member)
28*b* anti-back lever (restricting member)
30 reduction gear mechanism (driving device)
30*a* output shaft
32 motor (driving device)
34 movement direction conversion mechanism (driving device)
42 arm part
42*a* notch
42*b* through hole
43 support rod
44 abutting part
52 arm part
52*a* through hole
53 support rod
54 abutting part
54*a* long piece part
54*b* short piece part
60 roller cam (driving device)
60*a* main body
60*a*' notch part
60*b* roller
62 moving plate (driving device)
62*a* main part
62*a*' through hole
62*b* side wall part
63 bearing member
63*a* cylindrical part
63*b* flange part
64 bearing member
66 guide rod
67 guide block
68 roller member
82 support shaft
90 cart (cart)
92 frame
93 bracket
94 limit switch
120 towing device (towing device)
124 bearing member
126*a* hook lever (hook member)
126*b* hook lever (hook member)
128*a* anti-back lever (restricting member)
128*b* anti-back lever (restricting member)
142 arm part
144 abutting part
154 abutting part
162 moving plate (driving device)

182 support shaft
200 automatic guided vehicle (automatic guided vehicle)
202 vehicle body (vehicle body)
204 driving unit (driving unit)
206 front caster (caster)
220 towing device (towing device)
222 base plate
222a horizontal surface part
222b vertical surface part
222c bent piece part
223 support member
225a through hole
225b through hole
226 hook plate (hook member, moving member)
226a vertical surface part
226b bent extension part
226c hook part
226d bent piece part
226e wall part
226f wall part
227 notch opening
228a anti-back lever (restricting member)
229 support shaft
234 movement direction conversion mechanism (driving device)
252 arm part
252a notch
252b through hole
254 abutting part
255 stopper pin
260 roller cam (driving device)
260a main body
260b roller
262 block member (driving device)
264 linear bearing
266 rail member
270 coupling shaft
272 coupling bar (coupling member)
280 linear bearing mechanism
CS coil spring (driving device, spring member)
RS return spring
TB torsion spring
TBa1 one arm
TBa2 the other arm
BP spring stopper pin

The invention claimed is:

1. A towing device of an automatic guided vehicle, the towing device mounted on the automatic guided vehicle for towing a cart, the towing device comprising:
 a hook member that is engageable with a cart and is configured to be engaged with the cart in an elastically biased state at least when towing the cart; and
 a driving device for driving the hook member, the driving device including
  a motor having a rotating shaft;
  a moving member that reciprocates in a vertical direction based on a rotating motion of the rotating shaft; and
  a spring member for biasing the moving member vertically upward,
 the spring member is capable of applying a spring force to the hook member through the moving member,
 the hook member is configured to enter either an engageable state in which the hook member is capable of engaging with the cart based on a reciprocating motion in the vertical direction of the moving member or a non-engageable state in which the hook member is not engaged with the cart, and
 the hook member is configured to be engaged with the cart with the hook member being biased with the spring force when the hook member is in the engageable state.

2. The towing device according to claim 1, wherein the hook member is rotatably mounted to a vehicle body of the automatic guided vehicle and is configured to rotate based on the reciprocating motion in the vertical direction of the moving member.

3. The towing device according to claim 2, wherein the hook member includes a long handle part and a short handle part intersecting the long handle part, and
 the long handle part has a short-handle-side end part that is connected to the short handle part and that is engageable with the moving member, and has an opposite end part that is located opposite to the short-handle-side end part and that is rotatably supported to the vehicle body of the automatic guided vehicle.

4. A towing device of an automatic guided vehicle, the towing device mounted on the automatic guided vehicle for towing a cart, the towing device comprising:
 a hook member that is engageable with a cart and is configured to be engaged with the cart in an elastically biased state at least when towing the cart; and
 a driving device for driving the hook member, the driving device including:
  a motor having a rotating shaft;
  a moving member that reciprocates in a vertical direction based on a rotating motion of the rotating shaft; and
  a spring member for biasing the moving member vertically upward,
 the spring member is capable of applying a spring force to the hook member through the moving member,
 the hook member is configured to enter either an engageable state in which the hook member is capable of engaging with the cart based on a reciprocating motion in the vertical direction of the moving member or a non-engageable state in which the hook member is not engaged with the cart, the hook member is integral with the moving member and reciprocates in the vertical direction as the moving member reciprocates in the vertical direction, and
 the hook member is configured to be engaged with the cart with the hook member being biased with the spring force when the hook member is in the engageable state.

5. The towing device according to any one of claim 1 or 2-4, wherein
 the hook member engages with a frame of the cart on a rear side of the frame in a traveling direction of the automatic guided vehicle, when the automatic guided vehicle travels forward, and
 the towing device further includes a restricting member that restricts a forward movement of the frame in the traveling direction after the hook member engages with the frame.

6. The towing device according to claim 5, wherein the restricting member is configured to allow the frame to move rearward when the frame abuts against the restricting member on a front side of the restricting member, and to restrict the forward movement of the frame when the frame abuts against the restricting member on a rear side of the restricting member.

7. The towing device according to claim 6, wherein the restricting member is configured to allow the rearward movement of the frame by rotating or inclining when the frame abuts against the restricting member on the front side, and to restrict the forward movement of the frame by returning to an initial state when the abutment of the frame against the restricting member on the front side is released.

8. The towing device according to claim 7, wherein
the restricting member has an abutting surface against which the frame is able to abut from the front side of the restricting member, and
the abutting surface is configured to incline upward from the front side to the rear side of the restricting member.

9. An automatic guided vehicle comprising:
a vehicle body;
a driving unit that is swivelably mounted to the vehicle body;
a caster that is swivelably mounted to the vehicle body;
the towing device according to claim 1 or claim 4; and
a control device for controlling the driving unit and the towing device,
the automatic guided vehicle configured to tow the cart with the hook member of the towing device engaged with a frame of the cart.

10. The automatic guided vehicle according to claim 9, wherein
the automatic guided vehicle tows the cart in a state where the automatic guided vehicle is positioned under the cart.

11. The automatic guided vehicle according to claim 9, further comprising
a coupling member that is configured to be swingably coupled to the vehicle body, to extend toward the cart, the coupling member having an extended end,
wherein the towing device is mounted on the extended end.

* * * * *